(12) United States Patent
Kanamoto

(10) Patent No.: US 9,350,886 B2
(45) Date of Patent: May 24, 2016

(54) CONTROL APPARATUS, CONTROL METHOD, AND STORAGE MEDIUM

(71) Applicant: CANON KABUSHIKI KAISHA, Tokyo (JP)

(72) Inventor: Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/498,857

(22) Filed: Sep. 26, 2014

(65) Prior Publication Data

US 2015/0092237 A1    Apr. 2, 2015

(30) Foreign Application Priority Data

Oct. 2, 2013   (JP) .................. 2013-207423

(51) Int. Cl.
  *G06F 15/00*   (2006.01)
  *H04N 1/00*    (2006.01)
(52) U.S. Cl.
  CPC ........... *H04N 1/0048* (2013.01); *H04N 1/0096* (2013.01); *H04N 1/00408* (2013.01); *H04N 1/00708* (2013.01); *H04N 1/00771* (2013.01); *H04N 1/00949* (2013.01); *H04N 2201/0094* (2013.01)
(58) Field of Classification Search
  CPC .................. H04N 2201/0094; H04N 1/00408; H04N 1/00708

USPC ........................................................ 358/1.16
See application file for complete search history.

(56) References Cited

U.S. PATENT DOCUMENTS

2007/0189783 A1*  8/2007  Hattori ................ G03G 15/553
                                                   399/16

FOREIGN PATENT DOCUMENTS

JP      2010-49167 A    3/2010
JP     2010-284919 A   12/2010

* cited by examiner

*Primary Examiner* — Saeid Ebrahimi Dehkordy
(74) *Attorney, Agent, or Firm* — Canon USA. Inc. IP Division

(57) ABSTRACT

A control apparatus includes a receiving unit, a display unit, a storing unit, and a notification unit. The receiving unit receives a job. The display unit displays the job received by the receiving unit. The storing unit stores attribute information of a sheet held in a sheet holding unit. The notification unit performs, after the receiving unit has received a job and in response to change in attribute information, stored in the storing unit, of the sheet held in the sheet holding unit specified by the job, notification of the change in the attribute information of the sheet held in the sheet holding unit in an identifiable manner, in association with the job displayed on the display unit.

12 Claims, 22 Drawing Sheets

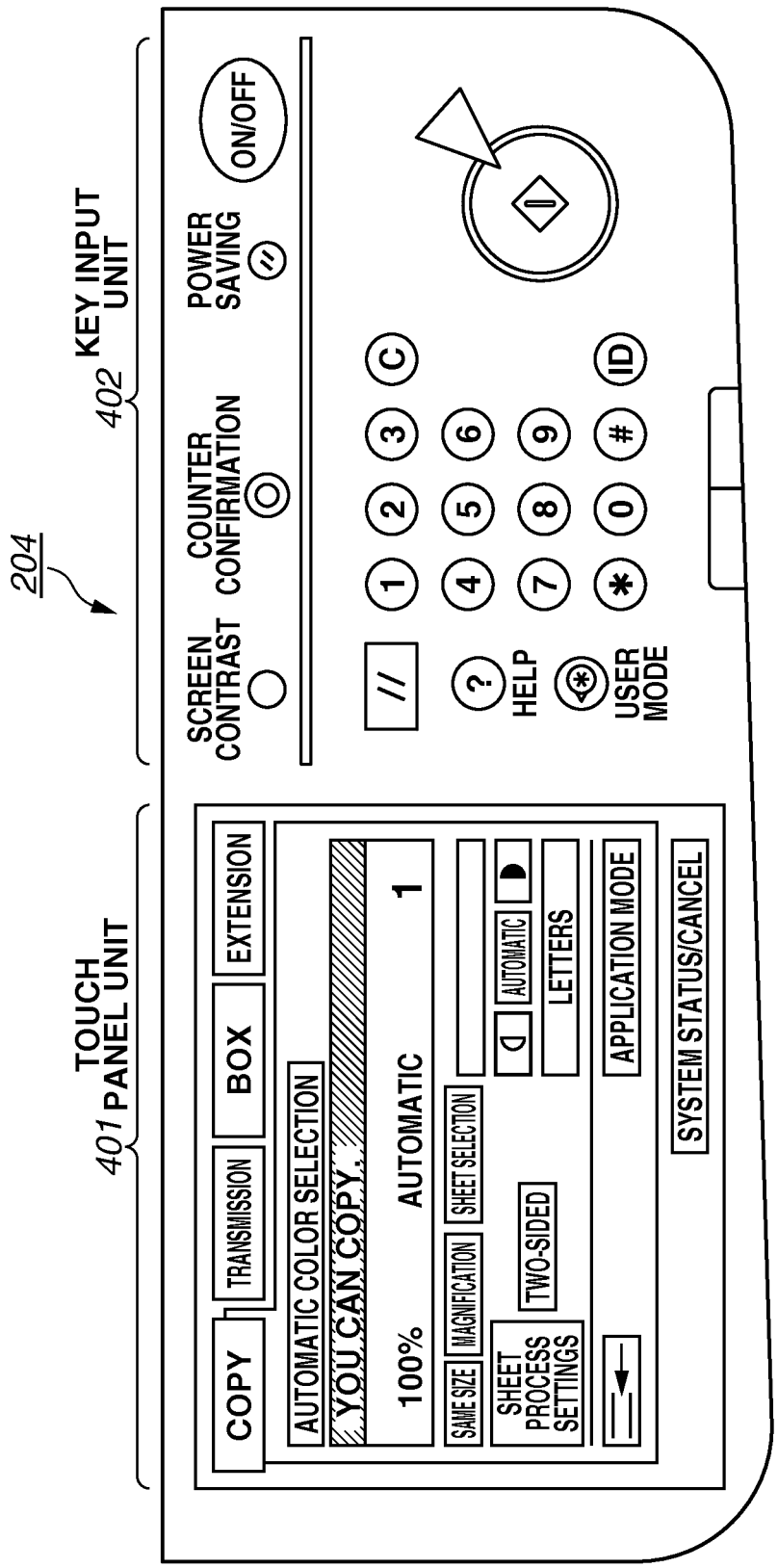

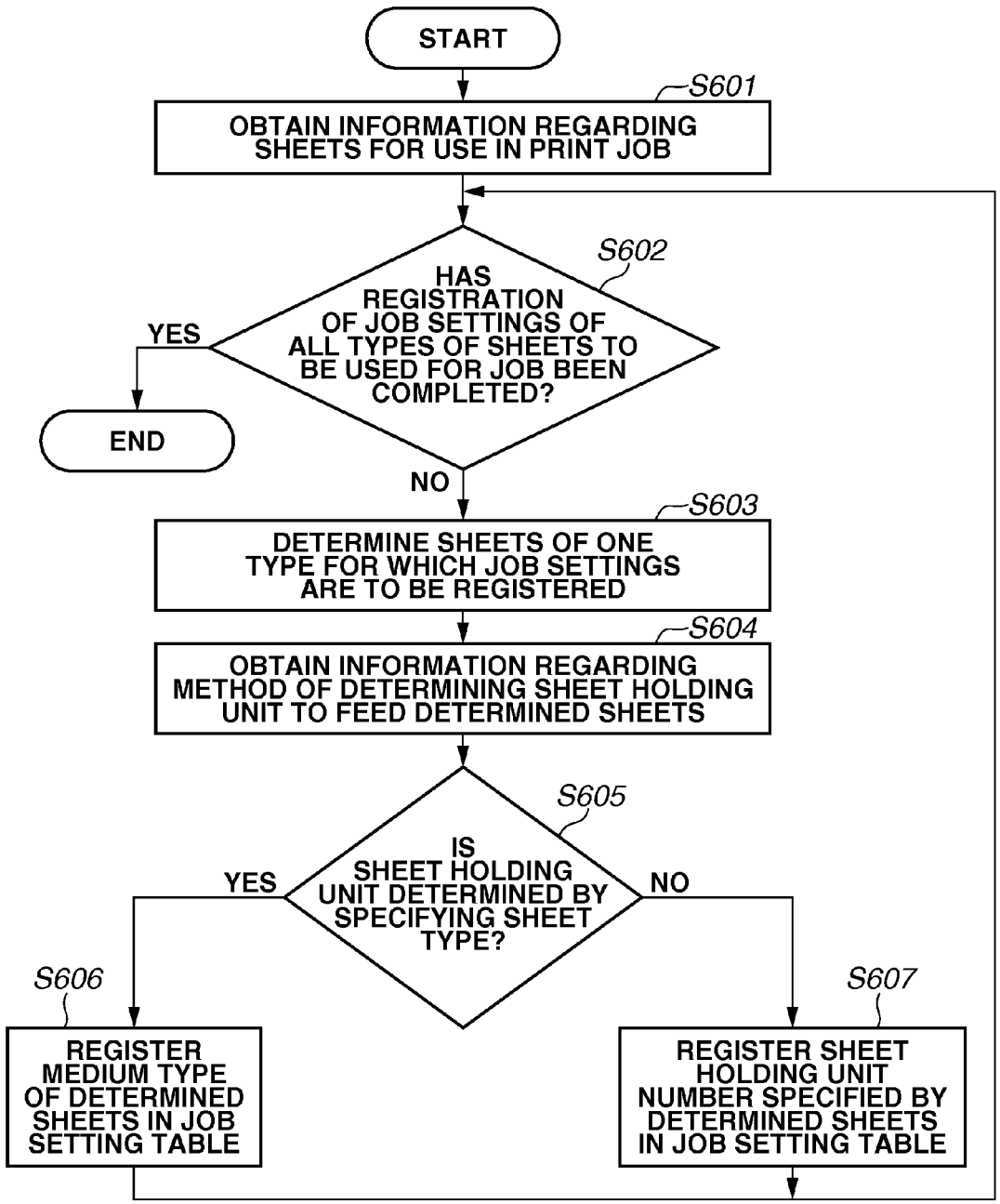

FIG.8

Job A

| SIZE (811) | MEDIUM TYPE (812) | SHEET HOLDING UNIT NUMBER (813) |
|---|---|---|
| A4 | NOT SET | 1 |
| A4 | NOT SET | 8 |

Job D

| SIZE | MEDIUM TYPE | SHEET HOLDING UNIT NUMBER |
|---|---|---|
| LTR | PLAIN PAPER 1 | NOT SET |
| 11 × 17 | PLAIN PAPER 1 | NOT SET |

Job E

| SIZE | MEDIUM TYPE | SHEET HOLDING UNIT NUMBER |
|---|---|---|
| A4 | PLAIN PAPER 1 | NOT SET |
| A4 | COLORED PAPER (RED) | NOT SET |
| A3 | TWO-SIDED COATED PAPER 2 | NOT SET |

FIG.9

| SHEET HOLDING UNIT NUMBER (911) | SIZE (912) | MEDIUM TYPE (913) | REMAINING AMOUNT (914) |
|---|---|---|---|
| 1 | A4 | PLAIN PAPER 1 | 3 |
| 2 | A4 | COLORED PAPER (RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | TWO-SIDED COATED PAPER 1 | 1 |
| 9 | 11 × 17 | PLAIN PAPER 1 | 0 |
| 10 | A3 | THICK PAPER 2 | 0 |

FIG.14

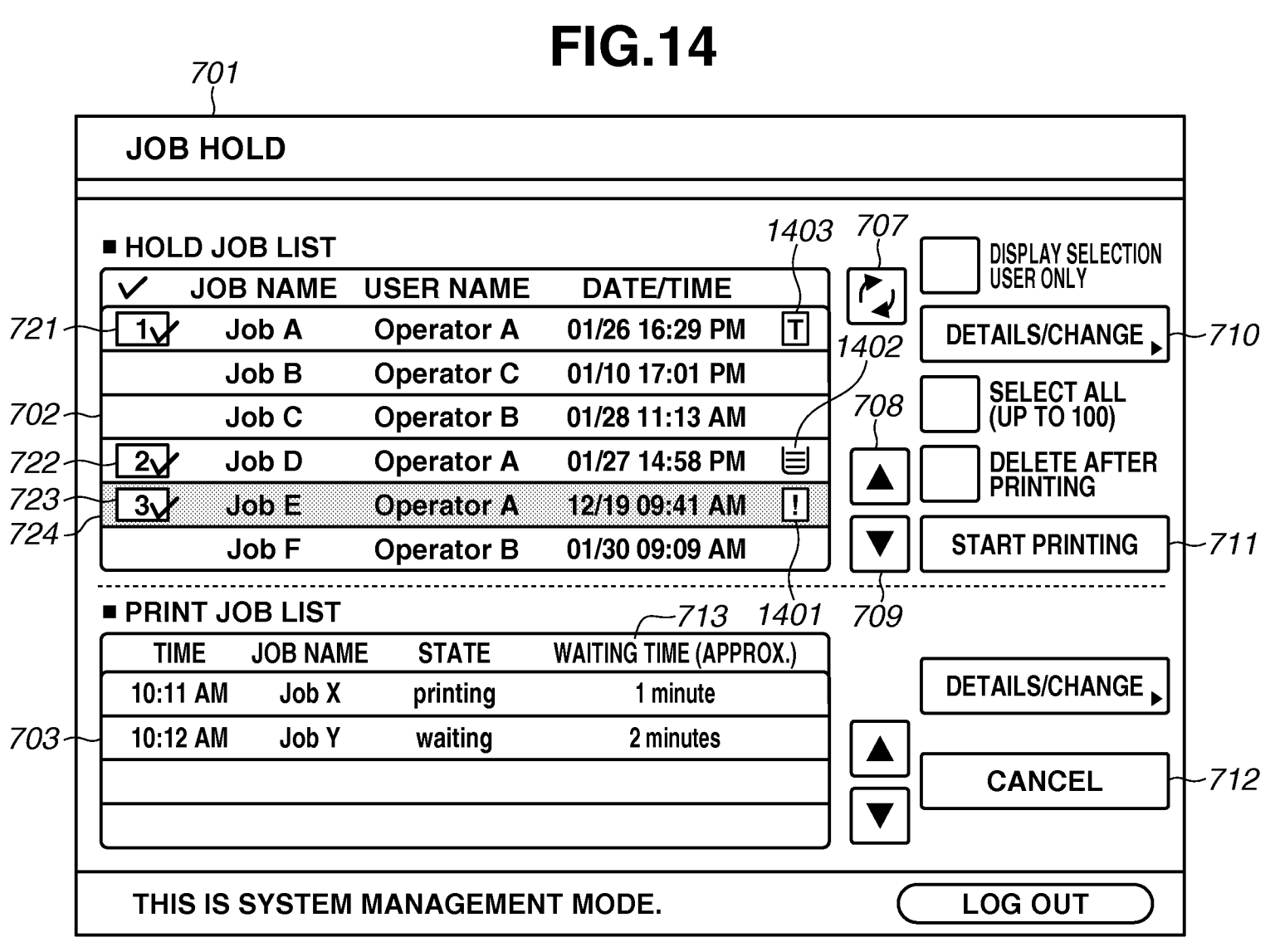

JOB HOLD — 701

■ HOLD JOB LIST

| | JOB NAME | USER NAME | DATE/TIME | |
|---|---|---|---|---|
| ✓ | | | | |
| 1 ✓ | Job A | Operator A | 01/26 16:29 PM | T |
| | Job B | Operator C | 01/10 17:01 PM | |
| | Job C | Operator B | 01/28 11:13 AM | |
| 2 ✓ | Job D | Operator A | 01/27 14:58 PM | ☰ |
| 3 ✓ | Job E | Operator A | 12/19 09:41 AM | ! |
| | Job F | Operator B | 01/30 09:09 AM | |

- DISPLAY SELECTION USER ONLY
- DETAILS/CHANGE ▲ — 710
- SELECT ALL (UP TO 100)
- DELETE AFTER PRINTING
- START PRINTING — 711

■ PRINT JOB LIST — 703

| TIME | JOB NAME | STATE | WAITING TIME (APPROX.) |
|---|---|---|---|
| 10:11 AM | Job X | printing | 1 minute |
| 10:12 AM | Job Y | waiting | 2 minutes |

DETAILS/CHANGE ▲
CANCEL — 712
LOG OUT

THIS IS SYSTEM MANAGEMENT MODE.

FIG.16

Job A

| SIZE | MEDIUM TYPE | SHEET HOLDING UNIT NUMBER |
|---|---|---|
| A4 | PLAIN PAPER 1 | 1 |
| A4 | TWO-SIDED COATED PAPER 1 | 8 |

Job D

| SIZE | MEDIUM TYPE | SHEET HOLDING UNIT NUMBER |
|---|---|---|
| LTR | PLAIN PAPER 1 | NOT SET |
| 11 × 17 | PLAIN PAPER 1 | NOT SET |

Job E

| SIZE | MEDIUM TYPE | SHEET HOLDING UNIT NUMBER |
|---|---|---|
| A4 | PLAIN PAPER 1 | NOT SET |
| A4 | COLORED PAPER (RED) | NOT SET |
| A3 | TWO-SIDED COATED PAPER 2 | NOT SET |

FIG.17

| | SHEET HOLDING UNIT NUMBER (911) | SIZE (912) | MEDIUM TYPE (913) | REMAINING AMOUNT (914) |
|---|---|---|---|---|
| 901 | 1 | A4 | EMBOSSED PAPER | 3 |
| 902 | 2 | A4 | COLORED PAPER (RED) | 1 |
| 903 | 3 | A3 | PLAIN PAPER 1 | 2 |
| 904 | 4 | B4 | PLAIN PAPER 1 | 0 |
| 905 | 5 | B5 | PLAIN PAPER 1 | 3 |
| 906 | 6 | A4 | INDEX PAPER | 3 |
| 907 | 7 | LTR | PLAIN PAPER 1 | 1 |
| 908 | 8 | A4 | TWO-SIDED COATED PAPER 1 | 1 |
| 909 | 9 | 11 × 17 | PLAIN PAPER 1 | 0 |
| 910 | 10 | A3 | THICK PAPER 2 | 0 |

CONTROL APPARATUS, CONTROL METHOD, AND STORAGE MEDIUM

BACKGROUND OF THE INVENTION

1. Field of the Invention

The present invention relates to a control apparatus, a control method, and a storage medium for saving a job and executing the saved job.

2. Description of the Related Art

Conventionally, there have been known a technique for, on an operation screen of a printing apparatus including a plurality of sheet holding units, notifying a user that attribute information of sheets (e.g., the size of sheets) to be used for a job is not registered in any of the sheet holding units (see Japanese Patent Application Laid-Open No. 2010-284919).

Further, there have been known a technique for, on a screen listing the statuses of jobs, notifying a user that the size of sheets to be used for a job is not registered in any of sheet holding units, or that sheets to be used for a job are not left (see Japanese Patent Application Laid-Open No. 2010-49167).

Before giving an instruction to execute a job specified that sheets to be used for the job are fed from a particular sheet holding unit, a user needs to confirm whether sheets are correctly held in the sheet holding unit specified by the job. This is because, between the saving of the job and the reception of the instruction to execute the job, another user may execute another job first. This may result in replacing the sheets held in the specified sheet holding unit. Before giving an instruction to execute the job, however, the user cannot easily know that the job is a job specified that sheets to be used for the job are fed from a particular sheet holding unit.

SUMMARY OF THE INVENTION

According to an aspect of the present invention, a control apparatus includes a receiving unit configured to receive a job, a display unit configured to display the job received by the receiving unit, a storing unit configured to store attribute information of a sheet held in a sheet holding unit, and a notification unit configured to perform, after the receiving unit has received a job and in response to change in attribute information, stored in the storing unit, of the sheet held in the sheet holding unit specified by the job, notification of the change in the attribute information of the sheet held in the sheet holding unit in an identifiable manner, in association with the job displayed on the display unit.

Before an instruction to execute a job specifying that sheets to be used for the job is fed from a particular sheet holding unit, a user needs to confirm whether sheets are correctly held in the sheet holding unit specified by the job. A control method in a control apparatus having a storing unit for storing attribute information of a sheet held in a sheet holding unit, the control method includes receiving a job, displaying the received job on a display unit, and performing, after the reception of a job and in response to the change in attribute information, stored in the storing unit, of the sheet held in the sheet holding unit specified by the job, notification of the change in the attribute information of the sheet held in the sheet holding unit in an identifiable manner, in association with the job displayed on the display unit. Further features of the present invention will become apparent from the following description of exemplary embodiments with reference to the attached drawings.

BRIEF DESCRIPTION OF THE DRAWINGS

FIG. 4 is a top view of an operation unit of the digital printing machine according to the first exemplary embodiment.

FIG. 6 is a flow chart illustrating a series of processes of registering job settings in a job setting table in the digital printing machine according to the first exemplary embodiment.

FIG. 8 is a diagram illustrating examples of pieces of information registered in job setting tables in the digital printing machine according to the first exemplary embodiment.

FIG. 9 is a diagram illustrating an example of a sheet management table for managing information of sheets held in each sheet holding unit of the digital printing machine according to the first exemplary embodiment.

FIG. 14 is a diagram illustrating an example of an operation screen of the job hold function displayed on the operation unit of the digital printing machine according to the first exemplary embodiment.

FIG. 16 is a diagram illustrating examples of pieces of information registered in job setting tables in the digital printing machine according to the second exemplary embodiment.

FIG. 17 is a diagram illustrating an example of a sheet management table for managing information of sheets held in each sheet holding unit of the digital printing machine according to the second exemplary embodiment.

DESCRIPTION OF THE EMBODIMENTS

Exemplary embodiments of the present invention will be described in detail below with reference to the attached drawings. The following exemplary embodiments is not intended to limit the present invention according to the appended claims, and not all the combinations of the features described in the exemplary embodiments are necessarily essential for a method for solving the problems in the present invention.

Figure 1:
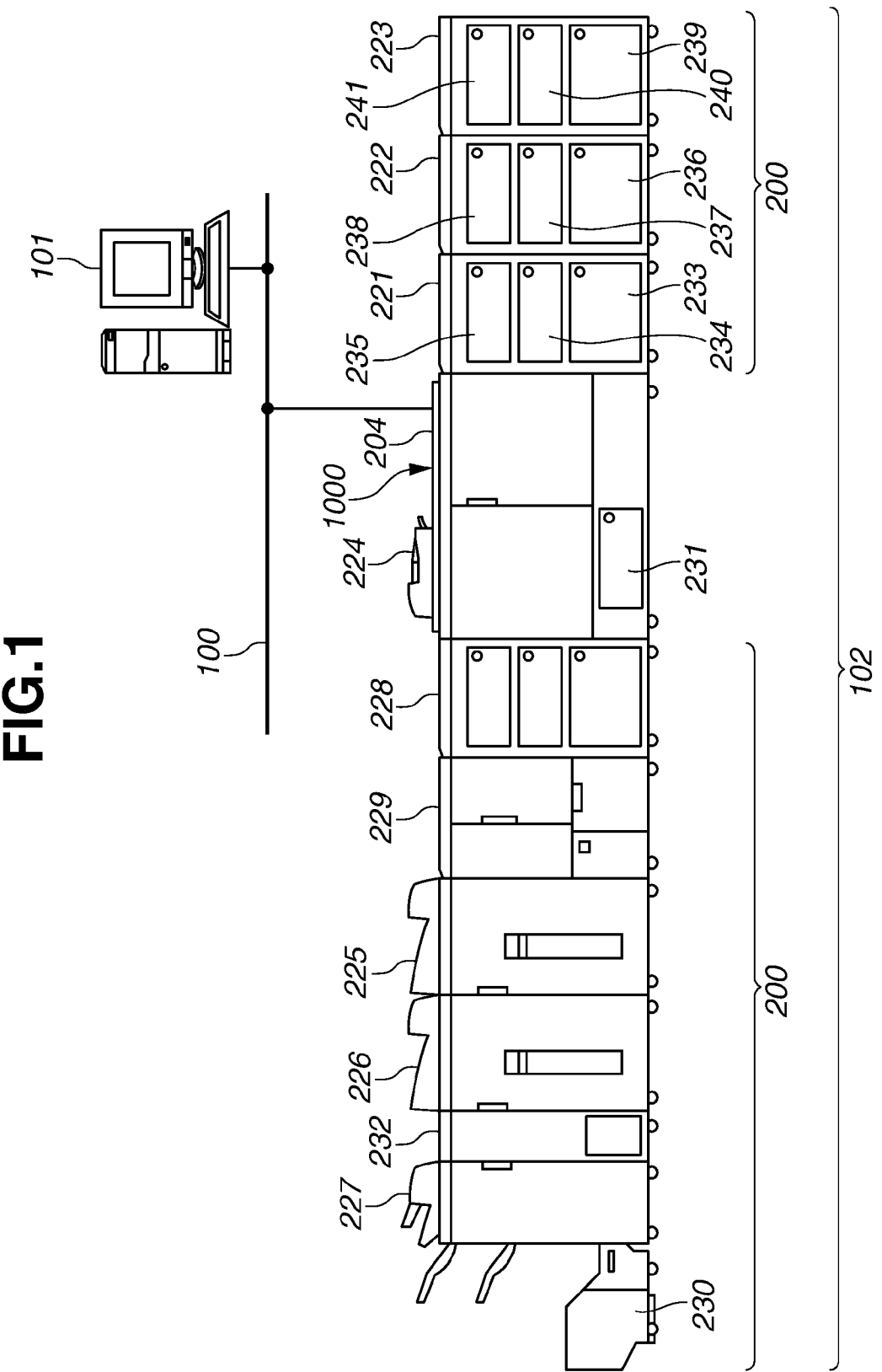
FIG. 1 is a diagram illustrating a digital printing system according to a first exemplary embodiment of the present invention.

With reference to FIG. 1, a digital printing system according to a first exemplary embodiment of the present invention is described. In the printing system, a digital printing machine (printing apparatus) 102 and a computer 101 are connected via a network 100. The digital printing machine 102 is a multifunction peripheral (MFP) (also referred to as an "image forming apparatus"), which includes a plurality of functions. The details of each function are described below. The digital printing machine 102 only needs to be able to perform color or monochrome printing.

The digital printing machine 102 includes devices having a plurality of different functions and linked together and is configured to perform a complex sheet process.

The digital printing machine 102 can be divided into three major parts with a printer unit 1000 as a boundary. In FIG. 1, the devices placed to the right of the printer unit 1000 are referred to as "sheet feeding devices". The main functions of the sheet feeding devices are to successively supply sheets held therein to the printer unit 1000 at appropriate timing. Further, these devices also detect the remaining amount of sheets held therein by sensors (not illustrated). A sheet holding unit 231 is provided also in the printer unit 1000 so that the printer unit 1000 can perform a function equivalent to those of the sheet feeding devices. Such a sheet holding unit included in the printer unit 1000 is also referred to as a "sheet feeding device" in the description. Each part included in the digital printing machine 102 is described below.

Based on image data, the printer unit 1000 forms (prints) an image on a medium (sheet) fed from a sheet holding unit, using toner. The configuration and the operating principle of the printer unit 1000 are as follows.

A light beam such as laser light modulated according to image data is reflected by a rotating multi-faced mirror (a polygon mirror) and a photosensitive drum is irradiated with the light beam as scanning light. An electrostatic latent image formed on the photosensitive drum by the laser light is developed by toner, and the developed toner image is transferred onto a sheet pressed against a transfer drum. The printer unit 1000 sequentially performs a series of steps of this image formation process using yellow (Y), magenta (M), cyan (C), and black (K) toners, thereby forming a full-color image on the sheet. Further, the printer unit 1000 may be configured to transfer, in addition to these four colors, a toner of another color termed a spot color or a transparent toner. The sheet on the transfer drum on which the full-color image has thus been formed is conveyed to a fixing device. The fixing device includes a roller and a belt and has a heat source such as a halogen heater built in the roller. The fixing device melts by heat and pressure the toner on the sheet onto which the toner image has been transferred, thereby fixing the toner onto the sheet. Although an electrophotographic method is described here, the present invention is not limited to this. Any printer such as an inkjet printer or a thermal transfer printer may be used.

The printer unit 1000 of the digital printing machine 102 according to the first exemplary embodiment includes a scanner (not illustrated) and an operation unit 204 (FIG. 4), which is placed on the upper surface of the printer unit 1000. The operation unit 204 is placed on the upper surface of the printer unit 1000 and therefore is not illustrated in detail in FIG. 1. The operation unit 204 provides various interfaces that allow a user to make various settings of and perform various operations of the printer unit 1000 according to the first exemplary embodiment. A document feeder 224 and a scanner 250 are provided in an upper portion of the main body of the printer unit 1000.

Further, the digital printing machine 102 is configured in such a manner that, in addition to the printer unit 1000, various accessory devices can be attached to the digital printing machine 102.

Large-capacity sheet feeding devices 221, 222, and 223 are sheet feeding devices directly or indirectly attachable to and detachable from the printer unit 1000. The sheet feeding devices 221, 222, and 223 include a plurality of sheet holding units 233 to 241. The plurality of sheet holding units 233 to 241 include sensors for detecting the remaining amount of sheets held in the respective sheet holding units. Such a configuration enables the printer unit 1000 to perform a printing process on a large number of sheets. An example is illustrated where the three large-capacity sheet feeding devices 221, 222, and 223 are connected to the printer unit 1000. The present invention, however, is not limited to this. Alternatively, only the large-capacity sheet feeding device 221 may be included. Further, the plurality of sheet holding units 233 to 241 may be sheet feeding trays or manual-bypass trays, or may include both sheet feeding trays and manual-bypass trays. Alternatively, not all of the sheet holding units 233 to 241 may be provided.

Large-capacity stackers 225 and 226 are devices for stocking sheets on which printing has already been performed. In the system including the large-capacity sheet feeding devices 221, 222, and 223, a large amount of printed matter is generated accordingly. This requires such large-capacity stackers. The numbers of large-capacity stackers and large-capacity sheet feeding devices are not limited to those in the configuration of FIG. 1. An example is illustrated where the two large-capacity stackers 225 and 226 are connected. The present invention, however, is not limited to this. Alternatively, only the large-capacity stacker 225 may be included.

Based on an instruction operation by the user, each of the large-capacity stackers 225 and 226 allows the opening of a door for taking out sheets stacked on a stacking tray in the large-capacity stacker. When the door is opened, the process of stacking, in the large-capacity stackers 225 and 226, sheets on which printing has already been performed is controlled to stop in advance.

Further, each of the large-capacity stackers 225 and 226 has a shift sheet discharge function for, when stacking sheets on which printing has already been performed, shifting the stacking position of any of the sheets. Thus, it is possible to sort a large number of stacked sheets into bundles each including a certain number of sheets.

A folding device 232 is a device for performing various folding processes such as a half fold, a Z-fold, a three-part fold, and a quarto fold on a sheet.

A saddle stitch binding machine 227 includes various units for enabling a stapling process and processes for creating a bookbinding output product, such as saddle stitching, saddle folding, a punching process, and a shift sheet discharge process, on sheets printed by the printer unit 1000. When a saddle stitch binding output product is created using the saddle stitch binding machine 227, the digital printing machine 102 according to the first exemplary embodiment forms an output product by combining the saddle folding function and the saddle stitching function of the saddle stitch binding machine 227 without using the folding function of the folding device 232.

A cutting device 230 is a device for conveying a bookbinding output product saddle-stitched by the saddle stitch binding machine 227 and cutting parts corresponding to fore-edges, thereby forming the edges into flat surfaces.

An inserter 228 inserts, at appropriate timing based on the setting, a sheet held by the inserter 228 between sheets sent from the printer unit 1000. The inserter 228 can insert a sheet on which printing does not need to be performed, between sheets on which printing has already been performed. Similarly to the large-capacity sheet feeding devices 221, 222, and 223, the inserter 228 includes a plurality of large-capacity sheet feeding portions to deal with a large-amount printing process.

A case binding machine 229 is a device for performing a process of gluing a cover on a single bundle of sheets printed by the printer unit 1000 or which has been discharged from the inserter 228, thereby forming a case-bound output product. Further, the case binding machine 229 can also perform a book block binding process, which corresponds to a finishing process for performing glue binding without attaching a cover.

The digital printing machine 102 may or may not include the folding device 232, the saddle stitch binding machine 227, the cutting device 230, the inserter 228, and the case binding machine 229 as its components.

In FIG. 1, the devices placed to the left of the printer unit 1000 are referred to as "sheet finishing devices", including the large-capacity stackers 225 and 226 for stacking sheets. Further, the sheet finishing devices are termed also as sheet processing devices or post-processing devices. The sheet finishing devices perform various finishing processes on, or accumulating, sheets on which a printing process has been completed. The sheet feeding devices and the sheet finishing devices are collectively referred to as a "sheet processing device 200" in the following description.

Figure 2:
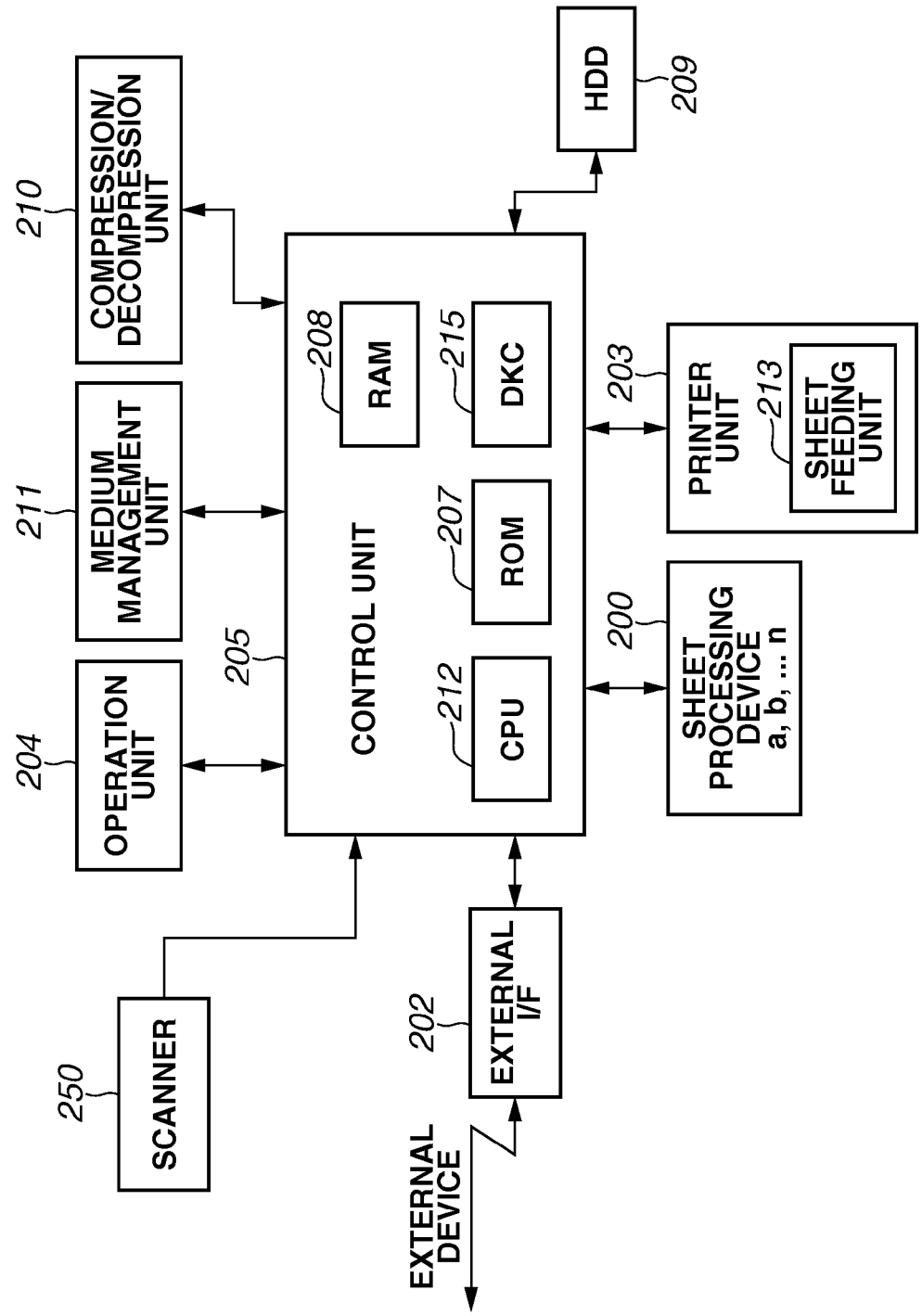
FIG. 2 is a functional block diagram illustrating a functional configuration of a digital printing machine according to the first exemplary embodiment.

Next, with reference to a functional block diagram illustrated in FIG. 2, the circuit configuration of the digital printing machine 102 according to the first exemplary embodiment is described. The digital printing machine 102 includes the following components as well as the sheet processing device 200, which includes the various sheet feeding devices and sheet finishing devices. More specifically, the digital printing machine 102 includes a compression/decompression unit 210, a hard disk drive (HDD) 209 serving as a storing unit, a medium management unit 211, a scanner 250, an external interface (I/F) 202, a printer unit 203, a controller unit (control unit) 205, and an operation unit 204. Each component is described below.

The compression/decompression unit 210 compresses and decompresses image data stored in a random-access memory (RAM) 208 or the HDD 209, using various compression methods such as Joint Bi-level Image Experts Group (JBIG) and Joint Photographic Experts Group (JPEG). In the first exemplary embodiment, the digital printing machine 102 using the HDD 209 is illustrated as an example. The present invention, however, is not limited to a hard disk so long as a similar large-capacity and non-volatile storage device is used. A non-volatile memory such as a solid-state drive (SSD) may be used instead of the HDD 209.

The HDD 209 is a non-volatile memory capable of storing therein a plurality of jobs to be processed and is configured to hold a plurality of pieces of data such as pieces of print data of jobs to be processed. Further, the HDD 209 stores various pieces of management information that are permanently stored, changed, and managed by the digital printing machine 102. The HDD 209 also stores various programs described below in advance and stores image data compressed by the compression/decompression unit 210.

The medium management unit 211 is a module for managing information regarding the types of sheets that can be processed by the digital printing machine 102. The information regarding the types of sheets that can be processed by the digital printing machine 102 is stored in the HDD 209.

The scanner 250 reads an image of a document, performs image processing on the image data obtained by reading the document, and outputs the resulting image data.

The external I/F 202 transmits and receives image data to and from an external device. The external device is, for example, a facsimile, a network connection device, or an external dedicated device.

The printer unit 203 performs processing of printing a job to be printed that is stored in the HDD 209. For example, the printer unit 203 can store data received from the scanner 250 in the HDD 209, read the data from the HDD 209, and execute a copy job. Further, the printer unit 203 can store a print job received via the external I/F 202 in the HDD 209, read the print job from the HDD 209, and execute the print job. Further, the printer unit 203 includes a sheet feeding unit 213. The sheet feeding unit 213 feeds sheets held in the sheet holding units 233 to 241. The controller unit 205 controls the sheet feeding operation of the sheet feeding unit 213 according to the determination of the sheet feeding source of sheets to be used for a job to be printed.

The controller unit 205 includes a central processing unit (CPU) 212 and controls the processes and the operations of the various units included in the digital printing machine 102. For example, the controller unit 205 also controls the operation of the sheet processing device 200. Further, the controller unit 205 stores in the HDD 209 a job to be processed that has been input via each of the various input units such as the scanner 250 and the external I/F 202. Then, the controller unit 205 reads the job from the HDD 209, outputs the job to the printer unit 203, and prints the job. Alternatively, the controller unit 205 performs control so that the job read from the HDD 209 can also be transmitted to an external device via the external I/F 202. As described above, the controller unit 205 performs various processing for outputting a job to be processed that is stored in the HDD 209. A description has been given taking the HDD 209 as an example. Alternatively, a volatile RAM may be used.

Further, the controller unit 205 includes a disk controller (DKC) 215 for controlling access to the HDD 209. Further, the controller unit 205 includes a read-only memory (ROM) 207 and the RAM 208, which is a readable and writable memory.

The ROM 207 stores programs for a boot sequence and font information in advance. Further, the ROM 207 also stores a display control program for causing a display unit of the operation unit 204 to display various user interface screens (hereinafter, "UI screens"). Further, the ROM 207 also stores a program for performing the operation of interpreting page description language (hereinafter abbreviated as "PDL") data received from an external device via the external I/F 202 and converting the PDL data into raster image data (bitmap image data). Similarly, the ROM 207 also stores a program for interpreting and processing a print job received from an external device via the external I/F 202. These programs are processed by software. On the other hand, the RAM 208 stores image data sent from the scanner 250 or the external I/F 202, various programs, and setting information.

The ROM 207 or the HDD 209 stores various control programs required to perform various processes of flow charts described below, which are performed by the CPU 212. Then, the CPU 212 reads a program stored in the ROM 207 or the HDD 209 and loads the program into the RAM 208, thereby performing various operations according to the first exemplary embodiment.

In the present exemplary embodiment, as illustrated in a top view of FIG. 4, the operation unit 204 includes a key input unit 402 and a touch panel unit 401. The key input unit 402 can receive an operation performed by the user using a hardware key. On the other hand, the touch panel unit 401 is a display unit capable of receiving an operation performed by the user using a software key (a display key) and displays an operation screen. The operation unit 204 is controlled by the controller unit 205. In FIG. 4, a screen displayed on the display unit of the touch panel unit 401 illustrates an operation screen displayed under the control of the controller unit 205. Items that are displayed on the display unit or that can be operated on the display unit vary according to the operation performed by the user on this screen or the various states of the digital printing machine 102. For example, if the user has operated the touch panel unit 401, a UI function program identifies the content of the operation through the touch panel unit 401 and performs processing according to the identified content. Although the operation unit 204 including the key input unit 402 and the touch panel unit 401 has been described, the present invention is not limited to this. Alternatively, the entirety of the operation unit 204 may include the touch panel unit 401.

In FIG. 1, the computer (personal computer (PC)) 101 according to the first exemplary embodiment is a general-purpose computer connected to the digital printing machine 102 via the network 100. In this case, the computer 101 can execute various application programs and transmit a print job to the digital printing machine 102.

Figure 3:
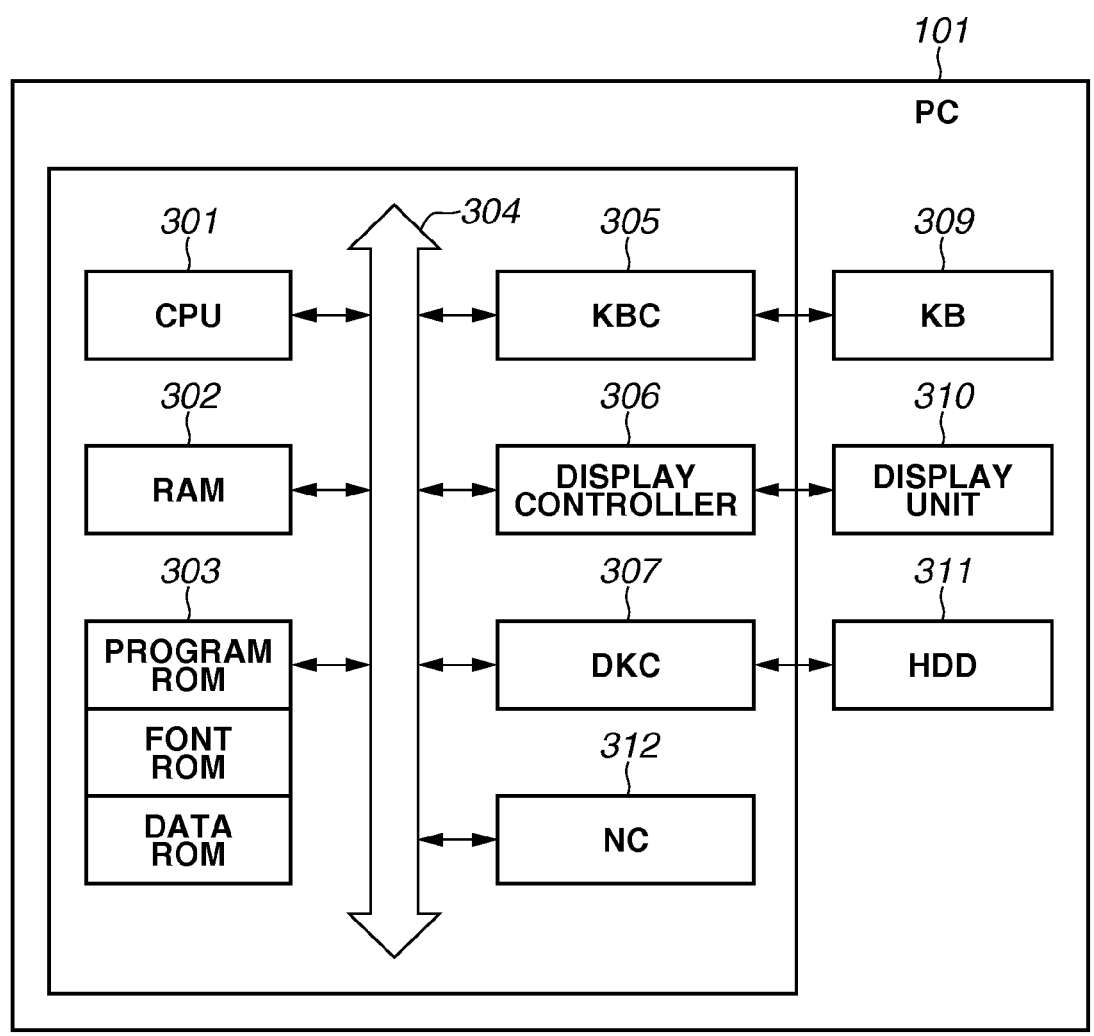
FIG. 3 is a block diagram illustrating a hardware configuration of a computer (PC) according to the first exemplary embodiment.

With reference to a hardware block diagram illustrated in FIG. 3, the configuration of the computer 101 is described. In FIG. 3, a CPU 301 executes programs for an operating system (OS), a general application, and a bookbinding application that are stored in a program ROM of a ROM 303 or loaded from an HDD 311 into a RAM 302. The ROM 303 also includes a font ROM and a data ROM. The RAM 302 functions as a main memory and a work area for the CPU 301. A keyboard controller (KBC) 305 controls an input from a keyboard 309 or a pointing device (not illustrated). A display controller 306 controls display on a display unit 310. A disk controller (DKC) 307 controls access to the HDD 311, which stores a boot program, various applications, font data, and a user file. A network controller (NC) 312 is connected to the network 100 and performs processing of controlling communication with another device connected to the network 100. A bus 304 connects the CPU 301 to the RAM 302, the ROM 303, the KBC 305, the display controller 306, and the NC 312, thereby conveying a data signal and a control signal.

Programs to be executed by the digital printing machine 102 are described.

These programs are stored in the HDD 209 and read and executed by the CPU 212 of the controller unit 205 of the digital printing machine 102.

A Job Definition Format (JDF) function program is a program for, if a JDF job has been received by the digital printing machine 102 via the external I/F 202, performing a print function by the controller unit 205.

A PDL function program is a program for, if data described in a PDL has been received by the digital printing machine 102 via the external I/F 202, performing a print function by the controller unit 205.

A UI function program is a program for controlling the operation unit 204. The UI function program identifies the content of an input provided by the user of the digital printing machine 102 through the operation unit 204, makes an appropriate screen transition, and gives a process request instruction to the controller unit 205.

A sheet management program is a program for performing a management function related to sheets that can be used by the digital printing machine 102. Sheet-related information, which is managed by the sheet management program, is stored in the HDD 209. In the present exemplary embodiment, the sheet-related information managed by the sheet management program is data regarding the size, the medium type, and the remaining amount of sheets held in each sheet holding unit. The sheet-related information is not limited to this. Alternatively, as the sheet-related information, data regarding, for example, the name of the sheets and the basis weight of the sheets may be further managed.

A job hold function program is a program to be executed by the controller unit 205 when the user of the digital printing machine 102 has given an instruction to perform a job hold function through the operation unit 204. The job hold function stores data to be printed in the HDD 209 of the digital printing machine 102 until a print instruction is received from the user. Then, the user selects data to be printed and gives an instruction to print the data, and the digital printing machine 102 prints the data for which the print instruction has been received. In the job hold function, the controller unit 205 sequentially instructs devices to operate in an appropriate order based on the processing order and the processing conditions described in the job hold function program, thereby performing a printing process based on job hold. These devices include the printer unit 203, the sheet processing device 200, the HDD 209, the compression/decompression unit 210, and the RAM 208. It is possible to execute a stored job by changing the settings of the job made when the job has been stored.

The computer 101, which is an external device, stores a print job in the job hold function of the digital printing machine 102 according to the following procedure. More specifically, the digital printing machine 102 instructs the job hold function to store a print job, instead of instructing the PDL function program or the JDF function program to perform processing of printing the job. The determination of whether to instruct the PDL function program or the JDF function program to print the job, or instruct the job hold function to perform processing of storing the job is made based on the specifying of a print application that operates on the computer 101 to which the job is input. This specifying is reflected on the setting attributes of a job to be processed by the PDL function program or the JDF function program. Consequently, the PDL function program or the JDF function program switches processes based on the setting attributes.

A mismatch determination program performs a function in which, if the user of the digital printing machine 102 has given an instruction to make a mismatch determination through the operation unit 204, the controller unit 205 makes the following determination. The mismatch determination includes the determination of whether attribute information (the medium) of sheets to be used for a print job is registered in any of the sheet holding units, and the determination of whether sheets to be used in the print job are left. The controller unit 205 reads pieces of attribute information of sheets that can be used by the digital printing machine 102, the pieces of attribute information stored in the HDD 209 of the digital printing machine 102 by the sheet management program. Then, the controller unit 205 compares the read pieces of attribute information with attribute information of sheets to be used for a job held by the job hold function program, thereby determining whether the attribute information of the sheets to be used for the print job is registered in any of the sheet holding units. Further, the controller unit 205 detects the remaining amount of sheets using a sensor provided in the sheet holding unit, thereby determining whether sheets to be used in the print job are left. The results of the mismatch determination made by the mismatch determination program are held as flags and stored in the RAM 208.

The attribute information of the sheets to be used for the print job includes at least one of the size of the sheets, the basis weight of the sheets, the surface property of the sheets, the shape of the sheets, and the color of the sheets.

Although the details of some of the function programs have been described above, not all the function programs need to be included. Alternatively, the configuration may be such that some of the function programs or function programs other than those described above are included.

Figure 5A:
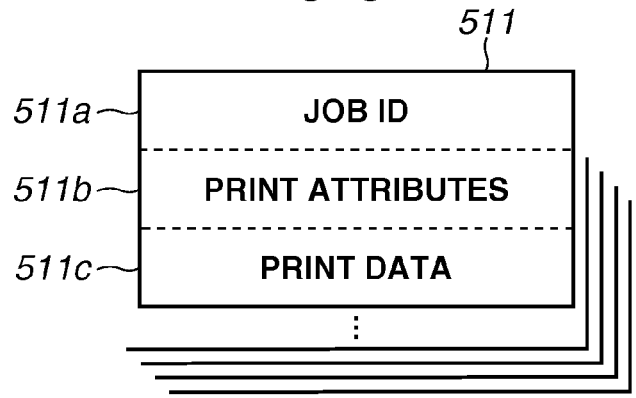
FIGS. 5A, 5B, and 5C are diagrams illustrating contents of data of an entry, a print queue buffer, and a hold queue buffer according to the first exemplary embodiment.
Figure 5B:
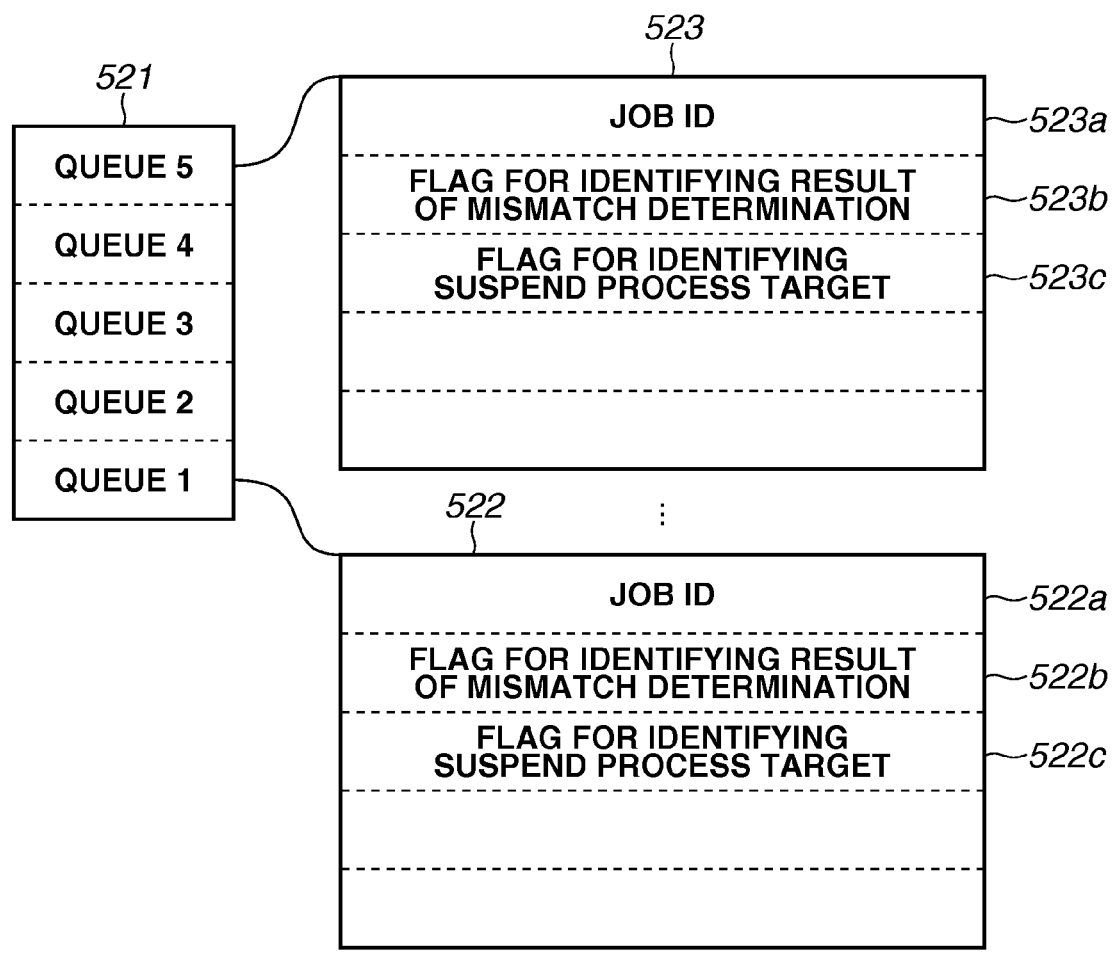
Figure 5C:
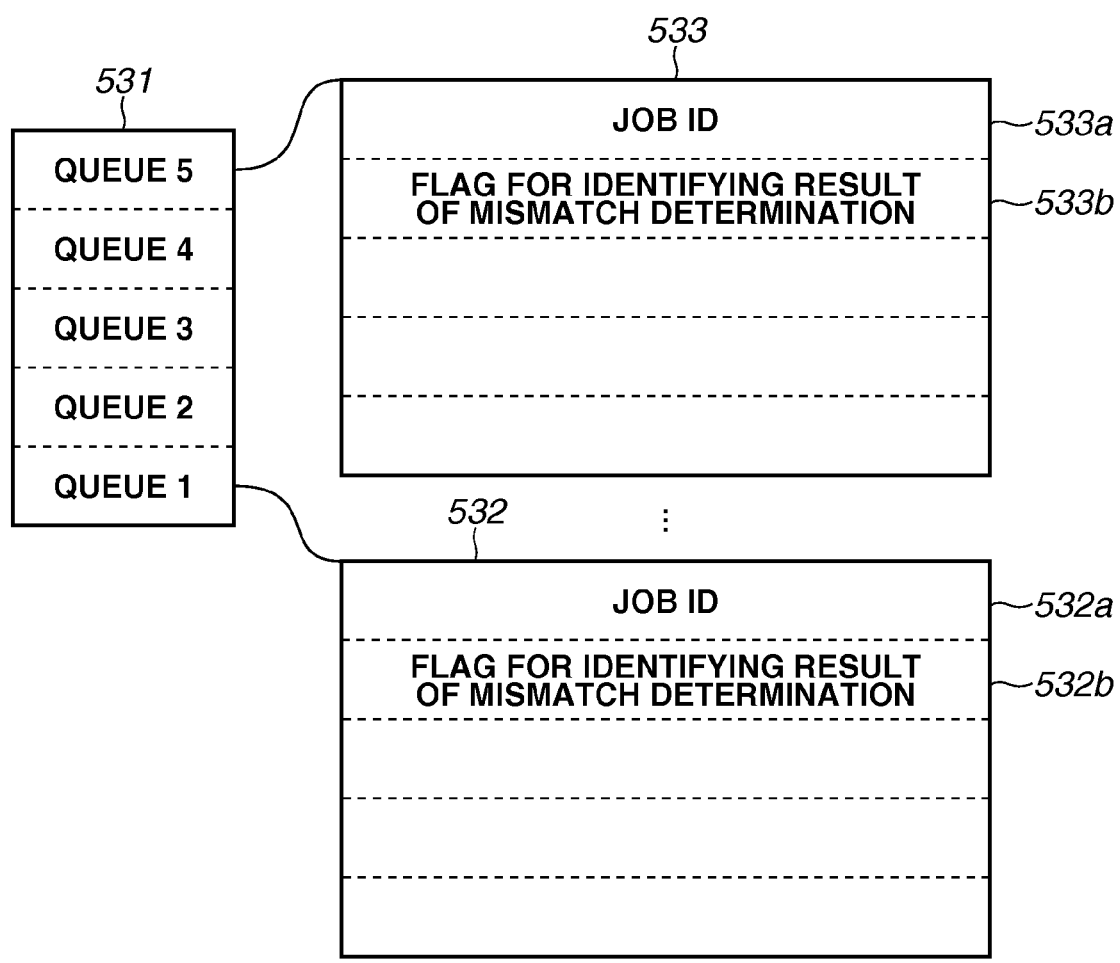

With reference to FIGS. 5A to 5C, the data structures of a job, print queue data, and hold queue data of the digital printing machine 102 according to the first exemplary embodiment are described.

First, with reference to FIG. 5A, the data structure of a job is described. A job that is input into the digital printing machine 102 has the structure of an entry 511 as illustrated in FIG. 5A. There are as many entries 511 as the number of jobs that are input into and processed by the digital printing machine 102. Each entry 511 includes a job identification (ID) 511$a$, print attributes 511$b$, and print data 511$c$. The job ID 511$a$ of the entry 511 is a unique ID and is used by the digital printing machine 102 to identify and specify a job. In the print attributes 511$b$ of the entry 511, the print attributes defined by the job are saved. As the print attributes, the name of the user who has input the job, the size and the medium type of sheets to be fed, and the number of pages are described. Further, in the print data 511$c$ of the entry 511, print data is saved, which is data describing an image to be drawn on a print sheet.

Next, with reference to FIG. 5B, the data structure of print queue data is described. If a job is input into a print queue, the input job is managed in the print queue buffer 521. Jobs are stacked as follows. If a job is input into a print queue having no job, the input job is registered in a queue 1 of the print queue buffer 521. If another job is input next, the input job is registered in a queue 2. Basically, the jobs are sequentially subjected to a printing process, starting with the job stacked in the queue 1. The job of which the printing has been completed is deleted from the print queue buffer 521. This causes the jobs in the print queue buffer 521 to move up in order. Then, the job stacked next in the queue 1 is subjected to a printing process. Although FIG. 5B illustrates only five queues, an appropriate number of queues are prepared taking into account the memory capacity of the digital printing machine 102 and the speed of the printing process.

The attributes of the job registered in each print queue are managed in an attribute table of the print queue job. In FIG. 5B, in the queues 1 and 5, attribute tables 522 and 523 corresponding to the respective jobs stacked in the print queue buffer 521 are registered. There are actually as many attribute tables as the number of queues in the print queue buffer 521. The details of the attribute table 522 of a print queue job are described below.

The attribute table 522 includes a job ID 522$a$, which is an ID for identifying the job, flags 522$b$ for identifying the results of a mismatch determination, and a flag 522$c$ for identifying whether the job is to be subjected to a suspend process.

The details of a medium mismatch determination will be described below with reference to FIG. 11. In the attribute table 522, the substance of the job does not exist. In the present exemplary embodiment, the following description is given on the assumption that in the attribute table of each print queue job, the substance of the job does not exist. However, the substance of the job may exist by copying the job. The plurality of entries 511 are searched for the job ID 511$a$ having the same value as the value of the job ID 522$a$. Then, the print attributes 511$b$ and the print data 511$c$ of the entry 511 specified by the job ID 511$a$ having the same value as the value of the job ID 522$a$ are obtained.

Next, with reference to FIG. 5C, the data structure of hold queue data is described. If an instruction is given to print any print data managed in a hold queue buffer 531, the print data transfers to the print queue buffer 521. If a job has been input into a hold queue, the input job is entered into the hold queue buffer 531. The hold queue buffer 531 is a storage area for a saved job managed by the job hold function program. A job to be saved that has been received from an external device is stored in the hold queue buffer 531 together with the print settings. The structure of the hold queue buffer 531 is similar to that of the print queue buffer 521 and therefore is not described in detail.

The attributes of the job registered in each hold queue are managed in an attribute table of the hold queue job. In FIG. 5C, in the queues 1 and 5, attribute tables 532 and 533 corresponding to the respective jobs stacked in the hold queue buffer 531 are registered. There are actually as many attribute tables as the number of queues in the hold queue buffer 531. The details of the attribute table 532 of a hold queue job are described below.

The attribute table 532 includes a job ID 532$a$, which is an ID for identifying the job, and flags 532$b$ for identifying the result of a mismatch determination. In the attribute table 532, the substance of the job does not exist. In the present exemplary embodiment, the following description is given on the assumption that in the attribute table of each hold queue job, the substance of the job does not exist. Alternatively, the substance of the job may exist by copying the job. The plurality of entries 511 are searched for the job ID 511$a$ having the same value as the value of the job ID 532$a$. Then, the print attributes 511$b$ and the print data 511$c$ of the entry 511 specified by the job ID 511$a$ having the same value as the value of the job ID 532$a$ are obtained.

Next, a description is given of the process from the input of a job into the stacking of the job in the print queue buffer 521 or the hold queue buffer 531. This process is achieved by the CPU 212 of the controller unit 205 by executing the job hold function program read from the ROM 207 or the HDD 209 and loaded into the RAM 208.

First, the user inputs a job to perform a printing process using the digital printing machine 102. Then, the CPU 212 records, as one of the attributes of the job, a queue specifying value as to whether the input job is a job specified to be stored in the print queue buffer 521 or a job specified to be stored in the hold queue buffer 531. After having received the job input by the user, the CPU 212 generates a unique ID and assigns the unique ID to the received job. Then, the CPU 212 creates an entry 511 in the job in such a manner that each job has one entry 511. The CPU 212 inputs the generated job ID into the job ID 511*a* of the entry 511, inputs the print attributes of the received job into the print attributes 511*b* of the entry 511, and inputs the received print data into the print data 511*c* of the entry 511.

Next, the CPU 212 reads the above queue specifying value. If the queue specifying value indicates a print queue, the CPU 212 stacks the job in a queue in the print queue buffer 521. If, on the other hand, the queue specifying value indicates a hold queue, the CPU 212 stacks the job in a queue in the hold queue buffer 531.

When stacking the job in a queue in the print queue buffer 521, the CPU 212 generates an attribute table 522 illustrated in FIG. 5B so that each job has one attribute table 522. Then, the CPU 212 registers the job ID in the job ID 522*a* of the attribute table 522.

When, on the other hand, stacking the job in a queue in the hold queue buffer 531, the CPU 212 generates an attribute table 532 illustrated in FIG. 5C so that each job has one attribute table 532. Then, the CPU 212 registers the job ID in the job ID 532*a* of the attribute table 532.

Jobs stacked in the hold queue buffer 531, that is, jobs held by the job hold function program, include a sheet type specifying job and a sheet holding unit specifying job.

The sheet type specifying job performs printing processing by specifying the type of sheets to be used for the print job and feeding sheets from a sheet holding unit in which the sheet type specified by the print job is set and registered. Thus, in the sheet type specifying job, it is possible to make a mismatch determination to be described below in step S1100 in FIG. 10, by comparing attribute information of sheets to be used for the sheet type specifying job with attribute information of sheets set and registered in a sheet holding unit.

On the other hand, the sheet holding unit specifying job is a job that specifies a particular sheet holding unit as the sheet feeding source of sheets to be used for printing. This is effective when it is desired to hold frequently used sheets in a particular sheet holding unit and feed the frequently used sheets from the particular sheet holding unit. If the sheet holding unit specifying job has been executed, sheets to be used for the print job are fed from the sheet holding unit specified by the sheet holding unit specifying job, and printing is performed on the sheets. Thus, in the sheet holding unit specifying job, when an instruction has been given to perform a printing process and if the sheets held in the sheet holding unit specified by the print job have been replaced by sheets different from the desired sheets, the desired printed matter may not be obtained.

Therefore, in the first exemplary embodiment, the operation of the mismatch determination process is controlled based on whether the job is a sheet type specifying job, which specifies the type of sheets to be used for the job, or a sheet holding unit specifying job, which specifies that sheets to be used for the job be fed from a particular sheet holding unit. A description is given of a case where, if a mismatch determination of a sheet type specifying job is made, the user is notified in an identifiable manner of the results of determining whether attribute information of sheets to be used for the job is registered in any of the sheet holding units, and determining whether sheets to be used for the job are left. A description is also given below of a case where, if, on the other hand, a mismatch determination of a sheet holding unit specifying job has been made, the user is notified that the job is a sheet holding unit specifying job, by, for example, displaying an identifiable mark on the operation unit 204.

Further, in the first exemplary embodiment, a description is given below of a case where a mismatch determination of a job stacked in the hold queue buffer 531 is made. However, a medium mismatch determination of a job stacked in the print queue buffer 521 may be made.

With reference to a flow chart illustrated in FIG. 6, a description is given of the details of a series of processes of registering in a job setting table the job settings of a job stacked in the hold queue buffer 531, according to the first exemplary embodiment. This process is achieved by the CPU 212 of the controller unit 205 executing the JDF function program or the PDL function program read from the ROM 207 or the HDD 209 and loaded into the RAM 208. In this process, the flow chart illustrated in FIG. 6 is started in the state where the analyzing process of print setting information included in job data received via the external I/F 202 has been performed, and the process of loading image data to be printed has been performed based on the analyzed print settings. Further, as illustrated in FIG. 8, the job setting table holds attribute information such as a size 811, a medium type 812, and a sheet holding unit number 813 of sheets to be used for the job. This attribute information is saved in the HDD 209.

In step S601, the CPU 212 obtains information regarding sheets to be used for a print job by performing the above-described analyzing process of print setting information, and the processing proceeds to step S602.

In step S602, the CPU 212 determines whether the registration of the job settings in the job setting table has been completed for all the types of sheets to be used for the print job. If the CPU 212 has determined that the registration has not been completed (NO in step S602), the processing proceeds to step S603. In step S603, the CPU 212 determines sheets of one type for which the job settings are to be registered, and the processing proceeds to step S604.

In step S604, the CPU 212 obtains information regarding the method of determining a sheet holding unit to feed the sheets determined in step S603, and the processing proceeds to step S605. The information regarding the method of determining a sheet holding unit is information as to whether a sheet holding unit to feed the sheets to be used for the job is determined by specifying a sheet type or determined by specifying a sheet holding unit. In a sheet type specifying job, the CPU 212 gives an instruction to the medium management unit 211 and refers to a sheet management table illustrated in FIG. 9, thereby determining a sheet holding unit to feed the sheets to be used for the job. The details of the sheet management table will be described below.

In step S605, the CPU 212 determines whether the information regarding the method of determining a sheet holding unit to feed the sheets determined in step S603 indicates the specifying of a sheet type or the specifying of a sheet holding unit.

If the CPU 212 has determined in step S605 that a sheet holding unit is determined by specifying a sheet type (YES in step S605), the processing proceeds to step S606.

In step S606, the CPU 212 registers the medium type 812 of the sheets determined in step S603 in the job setting table illustrated in FIG. 8, and the processing returns to step S602.

If, on the other hand, the CPU 212 has determined in step S605 that a sheet holding unit is determined by specifying a sheet holding unit (NO in step S605), the processing proceeds to step S607.

In step S607, the CPU 212 registers the sheet holding unit number 813 specified by the sheets determined in step S603 in the job setting table illustrated in FIG. 8, and the processing returns to step S602.

If, on the other hand, the CPU 212 has determined in step S602 that the registration of the job settings in the job setting table has been completed (YES in step S602), the CPU 212 ends the series of steps of the process of registering in a job setting table the job settings of a print job stacked in the hold queue buffer 531.

This is the details of the series of steps of the process of registering in a job setting table the job settings of a print job stacked in the hold queue buffer 531.

Next, the details of a mismatch determination process according to the present exemplary embodiment are described.

Figure 7A:
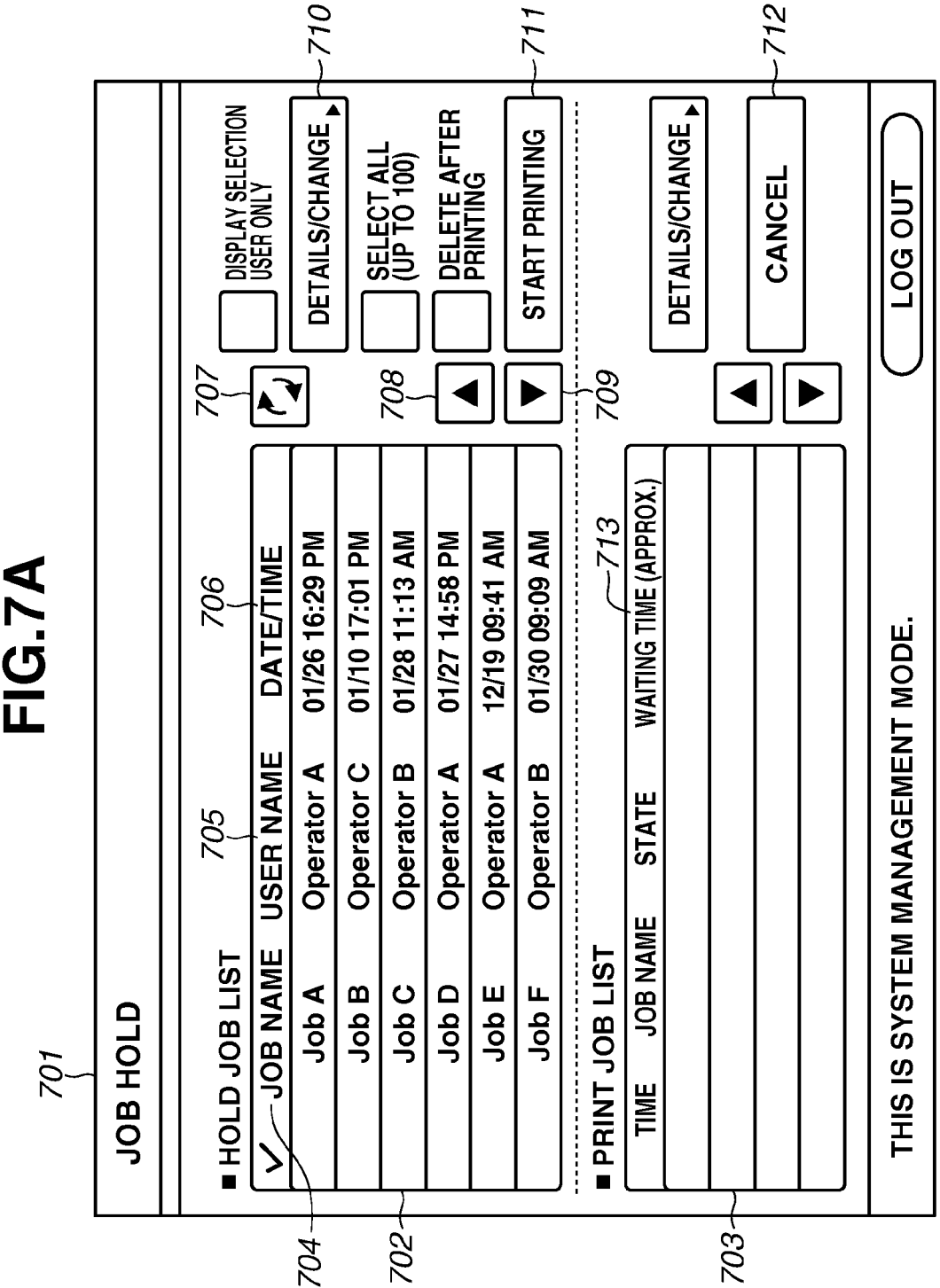
FIGS. 7A and 7B are diagrams illustrating examples of an operation screen of a job hold function displayed on the operation unit of the digital printing machine according to the first exemplary embodiment.

The mismatch determination process is started in a state where a screen illustrated in FIG. 7A is displayed on the display unit of the operation unit 204.

With reference to FIG. 7A, a description is given of an example of an operation screen of the job hold function displayed on the operation unit 204 in the digital printing machine 102 according to the first exemplary embodiment. This screen includes a plurality of display areas and a plurality of operation buttons. Important points in the first exemplary embodiment are described below. The job hold function is a function of storing data to be printed in the HDD 209 of the digital printing machine 102 until a print instruction is received from the user, and then printing data for which a print instruction has been received from the user. In the job hold function, the digital printing machine 102 can store a plurality of pieces of print job data in the HDD 209. The job hold function enables the user to specify the order of execution of print jobs by selecting a print job from a plurality of print jobs stored in the HDD 209. Thus, it is possible to print jobs regardless of the input order of jobs into the HDD 209.

A hold job list 702 is an area where a list of print jobs saved in the hold queue buffer 531 in the digital printing machine 102 is displayed. In the example of FIG. 7A, six print jobs are displayed. The digital printing machine 102 can store, in the HDD 209, more print jobs than the number of print jobs that can be simultaneously displayed in the hold job list 702. For example, if seven or more print jobs are currently stored therein, the user touches or presses scroll buttons 708 and 709, thereby enabling the sequential display of all the stored print jobs in the hold job list 702. For each of the print jobs displayed in the hold job list 702, a job name 704, a user name 705, and a date/time field 706, which indicates the date and time when the print job has been saved in the digital printing machine 102, are displayed.

A user who operates this job hold screen views the user name (operator name) 705 to identify the jobs of the user themselves and selects a job to be printed.

At this time, the user selects an object by pressing or touching with their finger a portion of any of the print jobs displayed in the hold job list 702. This causes the print job to enter into a selected state, that is, the state of being selected as a print job to be printed.

Figure 7B:
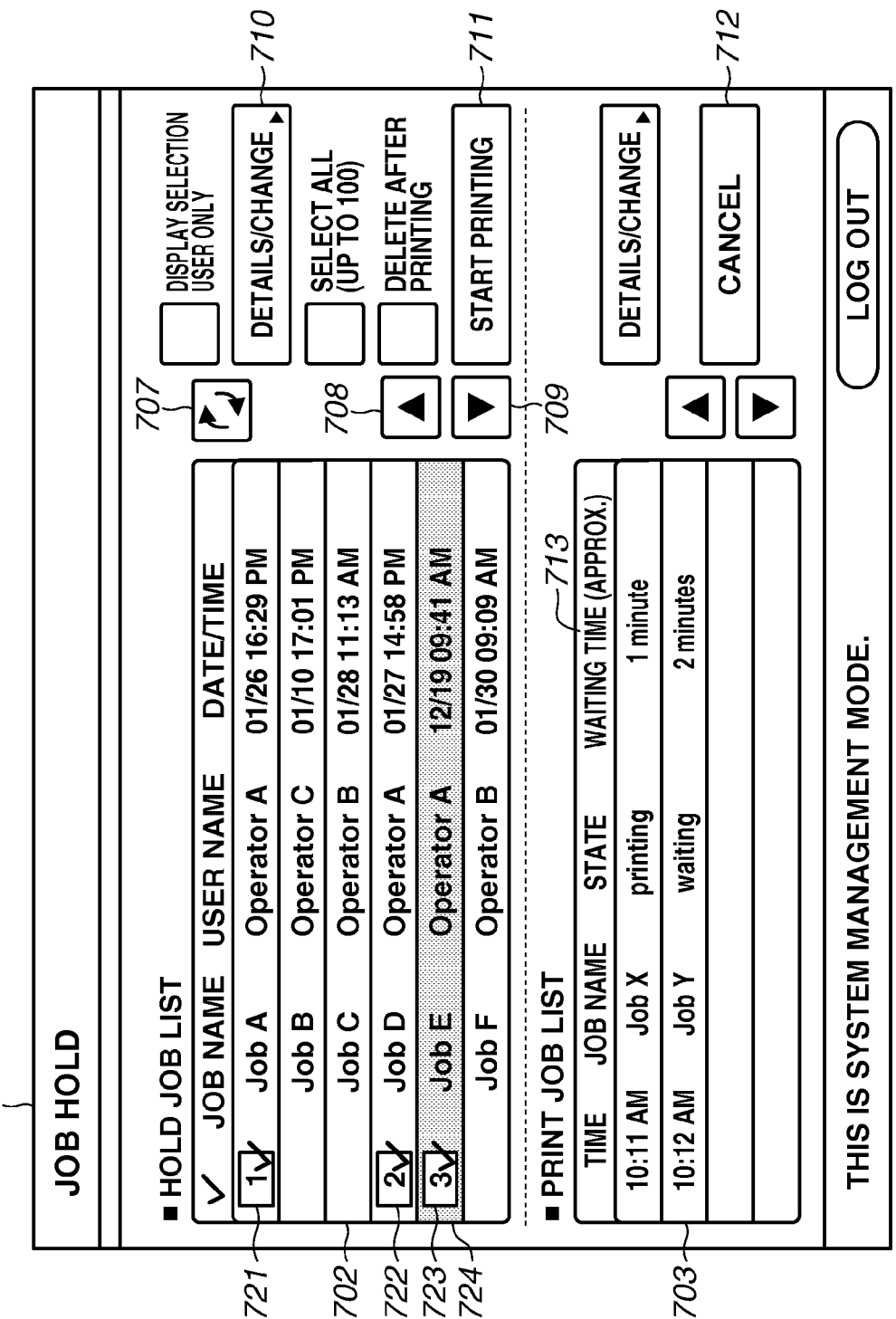

The example of FIG. 7B illustrates an example of display immediately after an operator A has selected print jobs by operating the operation screen of the job hold function displayed on the operation unit 204. In this case, as a result of the operator A sequentially selecting jobs A, D, and E, three jobs are in a selected state. The jobs in the selected state are indicated by selection marks 721, 722, and 723 on the left of the fields of the respective job names and are assigned numerical values indicating the order of selection. Further, the job selected last 724 is highlighted. The example of FIG. 7B indicates that the job E is the job selected last in the hold job list 702.

A print job list 703 indicates a print job on which a printing process has been started, or a print job that is waiting for the start of a printing process, in the digital printing machine 102. Further, the print job list 703 is also an area where a list of print jobs saved in the print queue buffer 521 is displayed. A waiting time 713 indicates the approximate waiting time until the printing process on each print job saved in the print queue buffer 521 is started.

In the example of FIG. 7B, a job X is a print job on which a printing process has been started (state: printing). On the other hand, a job Y is a print job that is waiting for the start of a printing process (state: waiting). If there is a print job on which a printing process has already been started in the print queue buffer 521, other print jobs remain in a state of waiting for a printing process until the printing process on the print job ends.

A details/change button 710 is a button for confirming the details of a print job in a selected state in the hold job list 702 or transitioning to a screen for changing the use of printing. In the example of FIG. 7B, if the user has pressed the details/change button 710 with the job E selected last, the user becomes able to confirm detailed information about the job E.

A start printing button 711 is a button for registering a print job selected from the hold job list 702 in the print queue buffer 521 and giving an instruction to start a printing process on the print job. If the user has pressed the start printing button 711 in the state where any of the print jobs displayed in the hold job list 702 is selected, the selected print job is displayed in the print job list 703, and a printing process on the print job is started. A cancel button 712 is a button for canceling the execution of a print job registered in the print queue buffer 521 using the start printing button 711.

A mismatch determination button 707 is a button for making a mismatch determination of a print job selected from the hold job list 702. If there is no print job selected from the hold job list 702, the mismatch determination button 707 may be grayed out so as not to be selected. In the example of FIG. 7B, a mismatch determination of each of the jobs A, D, and E in the selected states is made.

FIG. 8 illustrates job settings of the jobs A, D, and E registered in the job setting tables. As described above, each job setting table holds attribute information such as the size 811, the medium type 812, and the sheet holding unit number 813 of sheets to be used for the job. The sheet type is determined based on the combination of the size 811 and the medium type 812. It indicates that the job A is a sheet holding unit specifying job, and two types of sheets are used in total, i.e., sheets which are specified to be fed from a sheet holding unit 1 and of which the size is A4, and sheets which are specified to be fed from a sheet holding unit 8 and of which the size is A4. In a sheet holding unit specifying job, the medium type 812 is "not set" as illustrated in the job A in FIG. 8. On the other hand, it indicates that the job D is a sheet type specifying job, and two types of sheets are used in total, i.e., sheets of which the size is letter (LTR) and the medium type is "plain paper 1", and sheets of which the size is 11×17 and the medium type is "plain paper 1". It indicates that, similarly, the job E is a sheet type specifying job, and three types of sheets are used, i.e., sheets of which the size is A4 and the medium type is "plain paper 1", sheets of which the size is A4 and the medium type is "colored paper (red)", and sheets of which the size is A3 and the medium type is "two-sided coated paper 2". In a sheet type specifying job, the sheet holding unit number 813 is "not set" as illustrated in the jobs D and E in FIG. 8.

In a case of a sheet type specifying print job, the CPU 212 gives an instruction to the medium management unit 211 and refers to the sheet management table as illustrated in FIG. 9. With reference to FIG. 9, a description is given of an example of a sheet management table for managing information regarding sheets held in each sheet holding unit of the digital printing machine 102. This sheet management table is stored in the HDD 209 and referred to by the CPU 212. In the example illustrated in FIG. 9, information such as a size 912, a medium type 913, and a remaining amount 914 is managed using a sheet holding unit number 911 as a key with respect to each of ten sheet holding units included in the digital printing machine 102. The remaining amount of sheets is detected by a sensor included in each sheet holding unit.

For example, information 901 indicates that the size of the sheets held in the sheet holding unit 1 is A4, the medium type of the sheets is plain paper 1, and the remaining amount of the sheets is 3. The numerical value indicated by the remaining amount 914 means as follows. The numerical value "3" means full (100%). The numerical value "2" means a small remaining amount (25%). The numerical value "1" means an extremely small remaining amount (less than 5%). The numerical value "0" means no remaining amount (0%). It is possible to make the accuracy of detection of the remaining amount of sheets more detailed by increasing the accuracy of the remainder sensor. The digital printing machine 102 according to the first exemplary embodiment, however, detects the remaining amount of sheets based on the specifications as described above. For example, in the state of being full (100%), 3000 sheets are held in a sheet holding unit capable of holding 3000 sheets. In the state of having a small remaining amount (25%), 750 sheets are held in a sheet holding unit capable of holding 3000 sheets. In the state of having an extremely small remaining amount (less than 5%), less than 150 sheets are held in a sheet holding unit capable of holding 3000 sheets. In the state of having no remaining amount (0%), no sheets are held, i.e., the remaining amount of sheets is 0, in a sheet holding unit capable of holding 3000 sheets. As described above, the sensor included in each sheet holding unit can detect at three levels the remaining amount of sheets held in the sheet holding unit.

For example, with reference to the sheet management table in FIG. 9, a sheet type specifying print job using A4 colored paper (red) determines whether A4 colored paper (red) is registered in any of the sheet holding units. Then, as a result of determination that the size of the sheets held in a sheet holding unit 2 is A4 and the medium type of the sheets is colored paper (red), the sheet holding unit 2 is determined as a sheet feeding source (i.e., a sheet holding unit to feed sheets to be used for the job).

If, on the other hand, a sheet holding unit specifying print job has specified, for example, the sheet holding unit 1 as a sheet feeding source, "A4 plain paper 1" held in the sheet holding unit 1 is fed in the example of FIG. 9.

Figure 10:
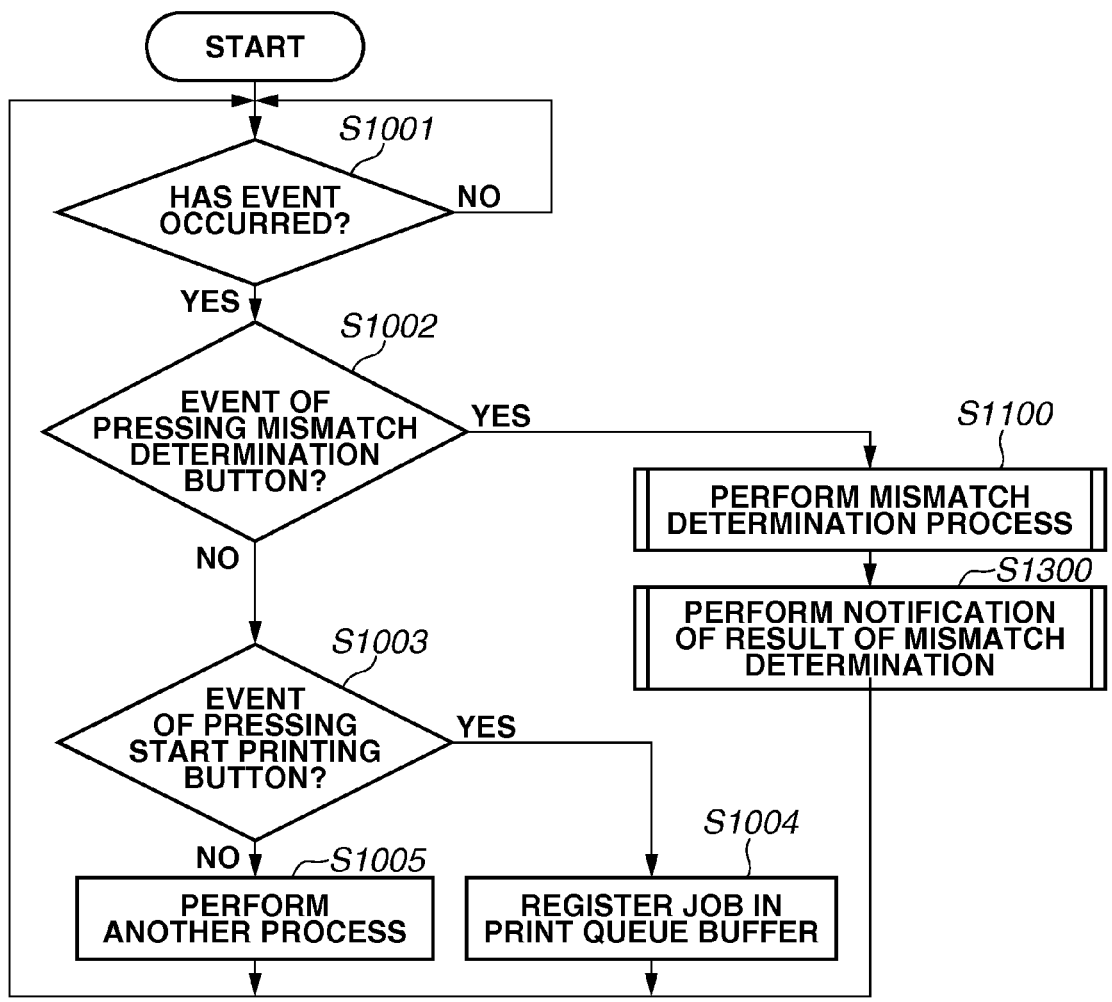
FIG. 10 is a flow chart illustrating a series of processes of a mismatch determination in the digital printing machine according to the first exemplary embodiment.

With reference to a flow chart illustrated in FIG. 10, a description is given of the details of a series of steps of the mismatch determination process of a job stacked in the hold queue buffer 531, according to the first exemplary embodiment. This process is achieved by the CPU 212 of the controller unit 205 executing the UI function program read from the ROM 207 or the HDD 209 and loaded into the RAM 208. The process of the flow chart illustrated in FIG. 10 is started in the state where there are jobs stacked in the hold queue buffer 531, the hold job list 702 is displayed on the operation unit 204, and some of the jobs have already been selected as in FIG. 7B.

In step S1001, the CPU 212 enters into the state of waiting for an operation performed by the user on the screen displayed on the operation unit 204 as illustrated in FIG. 7B. At this time, the CPU 212 remains in step S1001 until the user performs any operation. If the user has performed any operation on the operation unit 204 (YES in step S1001), the processing proceeds to step S1002.

In step S1002, the CPU 212 determines whether the mismatch determination button 707 has been pressed by this operation. If the CPU 212 has determined that the mismatch determination button 707 has been pressed (YES in step S1002), the processing proceeds to step S1100. If no print job is in a selected state, the mismatch determination button 707 may be grayed out so as not to be pressed. When a mismatch determination of only a selected print job is made and if no print job is in a selected state, the processing may not proceed to step S1100 even if the mismatch determination button 707 has been pressed. On the other hand, the pressing of the mismatch determination button 707 may make a mismatch determination of all the jobs stacked in the hold queue buffer 531.

In step S1100, the CPU 212 performs a mismatch determination process. The details of the mismatch determination process in step S1100 will be described below with reference to FIG. 11.

After the CPU 212 performs the mismatch determination process in step S1100, the processing proceeds to step S1300. In step S1300, the CPU 212 performs a mismatch determination result notification process. The details of the mismatch determination result notification process in step S1300 will be described below with reference to FIG. 13. After the CPU 212 performs the mismatch determination result notification process in step S1300, the processing returns to step S1001.

If, on the other hand, the CPU 212 has determined in step S1002 that the mismatch determination button 707 has not been pressed (NO in step S1002), the processing proceeds to step S1003.

In step S1003, the CPU 212 determines whether the start printing button 711 has been pressed by the operation performed by the user.

If the CPU 212 has determined that the start printing button 711 has been pressed (YES in step S1003), the processing proceeds to step S1004. If no job is in a selected state, the start printing button 711 is grayed out so as not to be pressed.

In step S1004, the CPU 212 registers in the print queue buffer 521 the job which has been selected from the hold job list 702 in FIG. 7B and on which an instruction has been given to perform a printing process. At this time, the job registered in the print queue buffer 521 is displayed in the print job list 703 illustrated in FIG. 7B and enters into the state of waiting for the printing process. After the CPU 212 registers the job in the print queue buffer 521 in step S1004, the processing returns to step S1001.

If, on the other hand, the CPU 212 has determined in step S1003 that the start printing button 711 has not been pressed (NO in step S1003), the processing proceeds to step S1005. In step S1005, the CPU 212 performs another process according to the operation performed by the user. The process of step S1005 may be, for example, the process of selecting a job once subjected to a mismatch determination and pressing the details/change button 710 in FIG. 7B, thereby transitioning to a screen for calling the details of the job in the selected state.

Figure 11:
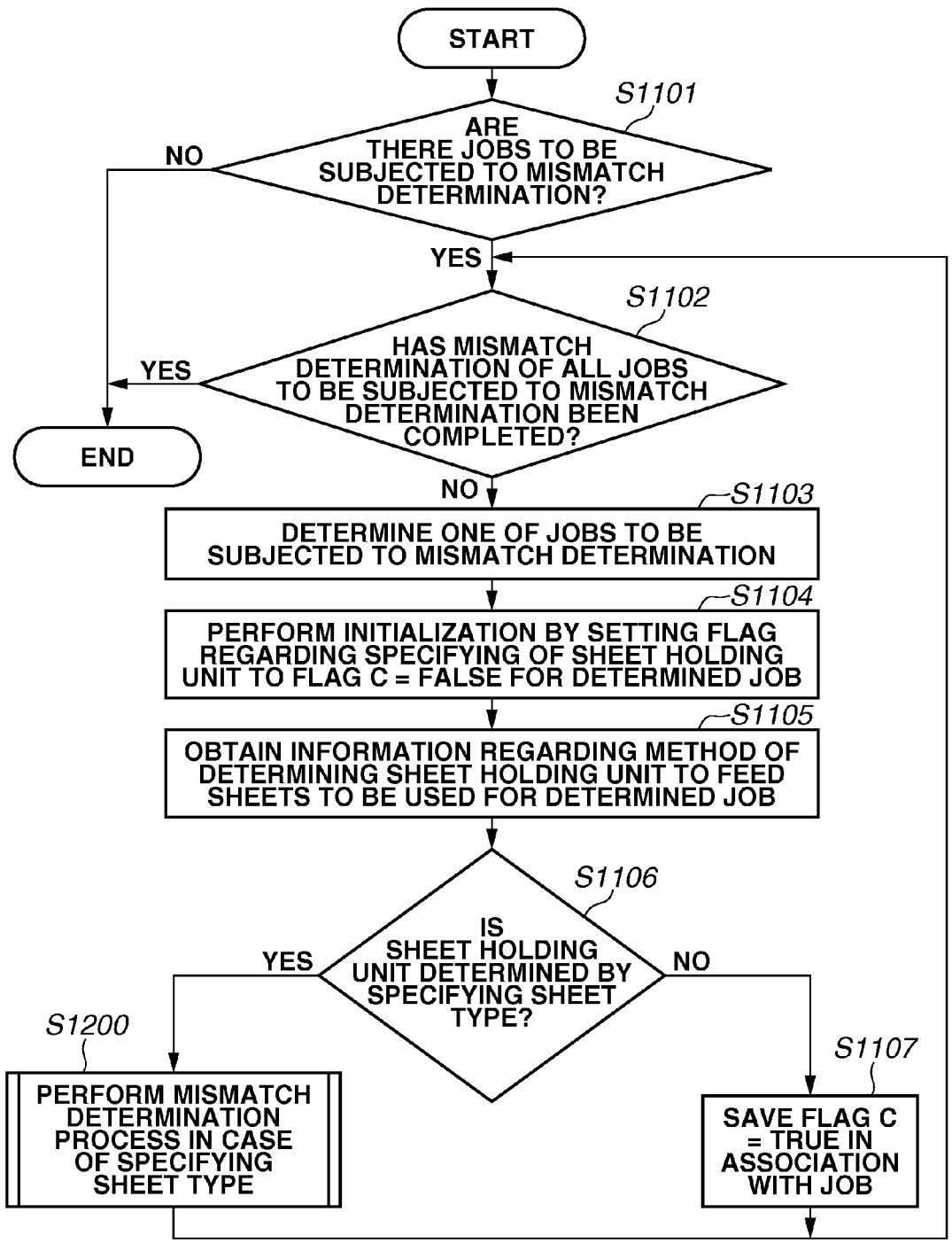
FIG. 11 is a flow chart illustrating a mismatch determination process (step S1100) illustrated in FIG. 10 in the digital printing machine according to the first exemplary embodiment.

FIG. 11 is a flow chart illustrating details of the mismatch determination process in step S1100 in FIG. 10 according to the first exemplary embodiment. This process is achieved by the CPU 212 of the controller unit 205 executing the mismatch determination program read from the ROM 207 or the HDD 209 and loaded into the RAM 208. The mismatch determination process in step S1100 according to the first exemplary embodiment is performed in response to the pressing of the mismatch determination button 707. Further, in response to the fact that the mismatch determination button 707 has been pressed again, the mismatch determination is made again to update the results of the determination.

In the first exemplary embodiment, among the print jobs displayed in the hold job list 702, a print job selected by the user is subjected to the process described below. Alternatively, not only a print job selected by the user but also all the print jobs stacked in the hold queue buffer 531 may be subjected to the process described below.

First, in step S1101, the CPU 212 determines whether the number of print jobs to be subjected to the mismatch determination is one or more. If the CPU 212 has determined in step S1101 that the number of print jobs to be subjected to the mismatch determination is one or more (YES in step S1101), the processing proceeds to step S1102. If, on the other hand, the CPU 212 has determined in step S1101 that the number of print jobs to be subjected to the mismatch determination is not one or more (NO in step S1101), the mismatch determination process (step S1100) ends, and the processing proceeds to step S1300 in FIG. 10.

Then, in step S1102, the CPU 212 determines whether the mismatch determination of all the print jobs to be subjected to the mismatch determination has been completed. If the CPU 212 has determined that the mismatch determination of all the print jobs to be subjected to the mismatch determination has not yet been completed (NO in step S1102), the processing proceeds to step S1103.

In step S1103, the CPU 212 determines one of the print jobs to be subjected to the mismatch determination, and the processing proceeds to step S1104.

In step S1104, the CPU 212 performs an initialization process by setting a flag (a flag C) regarding the specifying of a sheet holding unit, for the print job determined to be subjected to the mismatch determination in step S1103. The flag C is a flag for holding the result of determination of whether the print job determined to be subjected to the mismatch determination is a sheet holding unit specifying job. The flag C is stored in the RAM 208. In the present exemplary embodiment, the value of the flag C is stored and read to notify the user that the job determined to be subjected to the mismatch determination in step S1103 is a job specifying that sheets to be used for the job are fed from a particular sheet holding unit. Then, if the read value of the flag C is false, it indicates that the job is a sheet type specifying job. If, on the other hand, the read value of the flag C is true, it indicates that the job is a sheet holding unit specifying job. The value of the flag C is initialized to false.

Then, in step S1105, the CPU 212 obtains information as to whether a sheet holding unit to be used for the print job determined to be subjected to the mismatch determination in step S1103 is determined by specifying a sheet type or specifying a sheet holding unit, and the processing proceeds to step S1106. The method of determining a sheet holding unit to be used for the print job can be obtained with reference to the result of the analyzing process of print setting information (the job setting table) described above.

If the CPU 212 has determined in step S1106 that the print job is a sheet type specifying job (YES in step S1106), the processing proceeds to step S1200. The details of the process of step S1200 will be described below with reference to FIG. 12. If the process of step S1200 has been completed, the processing returns to step S1102.

If, on the other hand, the CPU 212 has determined that the print job is a sheet holding unit specifying job (NO in step S1106), the processing proceeds to step S1107. In step S1107, the CPU 212 sets the value of the flag C to "true", which indicates that the print job determined to be subjected to the mismatch determination in step S1103 is a sheet holding unit specifying job. Then, the CPU 212 saves the set value of the flag C in association with the print job, and the processing returns to step S1102.

If, on the other hand, the CPU 212 has determined in step S1102 that the mismatch determination of all the print jobs to be subjected to the mismatch determination has been completed (YES in step S1102), the mismatch determination process (step S1100) ends, and the processing proceeds to step S1300 in FIG. 10.

This is the detailed description of the mismatch determination process performed in step S1100 in FIG. 10.

Figure 12:
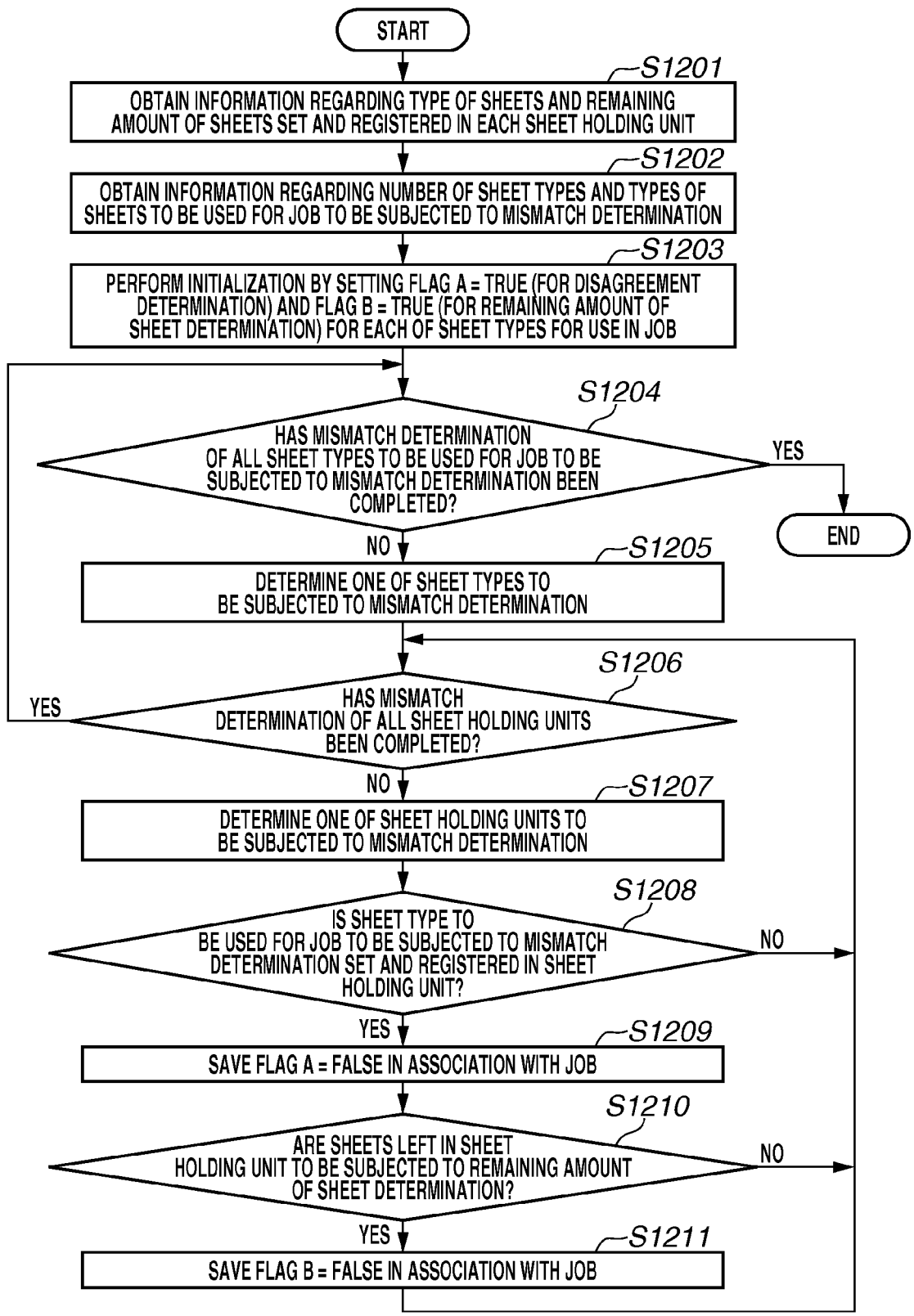
FIG. 12 is a flow chart illustrating the mismatch determination process on a sheet type specifying job (step S1200) illustrated in FIG. 11 in the digital printing machine according to the first exemplary embodiment.

FIG. 12 is a flow chart illustrating the process performed in step S1200 in FIG. 11, which is the mismatch determination process to be performed when the print job to be subjected to the mismatch determination is a sheet type specifying job. This process is achieved by the CPU 212 of the controller unit 205 executing the mismatch determination program read from the ROM 207 or the HDD 209 and loaded into the RAM 208.

In step S1201, the CPU 212 obtains information regarding the type of sheets and the remaining amount of sheets set in each sheet holding unit included in the digital printing machine 102. The process of step S1201 is performed by the CPU 212 giving an instruction to the medium management unit 211 and referring to, for example, the sheet management table in FIG. 9. In step S1202, the CPU 212 reads the print job to be subjected to the mismatch determination and saved in the hold queue buffer 531. Then, with reference to the job setting table in FIG. 8, the CPU 212 obtains the number of sheet types specified among the sheets to be used for the print job.

Next, in step S1203, the CPU 212 performs an initialization process by setting two types of flags (flags A and B) for holding the results of the mismatch determination, for each of the sheet types obtained in step S1202. The flag A is a flag for holding the result of determining whether attribute information of the sheets to be used for the print job is registered in any of the sheet holding units. The flag A is stored in the RAM 208. On the other hand, the flag B is a flag for holding the result of determination of whether sheets to be used in the print job are left. The flag B is stored in the RAM 208. If the flag A is true, it indicates that the medium is in a mismatched (sheet type disagreement) state, that is, the print job specifies a sheet type that is not set in any of the sheet holding units. On the other hand, if the flag B is true, it indicates that the medium is in a mismatched (no-sheets-left) state, that is, the remaining amount of sheets of the sheet type to be used for the print job is 0. The value of the flag A is initialized to true (mismatched), and the value of the flag B is initialized to true (no sheets are left).

Next, in step S1204, the CPU 212 determines whether the mismatch determination process on all the sheet types to be used for the print job to be subjected to the mismatch determination has been completed. If the CPU 212 has determined that the mismatch determination process on all the sheet types has not been completed (NO in step S1204), the processing proceeds to step S1205. In step S1205, the CPU 212 determines one of the sheet types to be subjected to the mismatch determination in the print job, and the processing proceeds to step S1206.

In step S1206, the CPU 212 determines whether the mismatch determination process on all the sheet holding units included in the digital printing machine 102 has been completed. If the CPU 212 has determined that there is a sheet holding unit that has not yet been subjected to the mismatch determination process (NO in step S1206), the processing proceeds to step S1207. In step S1207, the CPU 212 determines one of the sheet holding units to be subjected to the mismatch determination next, and the processing proceeds to step S1208.

In step S1208, the CPU 212 determines whether the sheet type determined to be subjected to the mismatch determination in step S1205 is set and registered in the sheet holding unit determined in step S1207. If the CPU 212 has determined that the sheet type is set and registered (YES in step S1208), the processing proceeds to step S1209. If, on the other hand, the CPU 212 has determined in step S1208 that the sheet type is not set and registered (NO in step S1208), the processing returns to step S1206. Then, the CPU 212 performs the process of step S1206 and subsequent steps.

In step S1209, the CPU 212 saves the value of the flag A as "false (matched)", which indicates that the print job specifies the sheet type registered in the sheet holding unit, in association with the print job, and the processing proceeds to step S1210. In step S1210, the CPU 212 determines whether sheets are left in the sheet holding unit determined to be subjected to the mismatch determination in step S1207. If the CPU 212 has determined that sheets are left (YES in step S1207), the processing proceeds to step S1211. In step S1211, the CPU 212 saves the value of the flag B as "false (sheets are left)", which indicates that sheets of the sheet type to be used for the print job are left, in association with the print job, and the processing returns to step S1206. Then, the CPU 212 performs the process of S1206 and thereafter. If, on the other hand, the CPU 212 has determined in step S1210 that no sheets are left (NO in step S1210), the processing returns to step S1206. Then, the CPU 212 performs the process of step S1206 and thereafter.

If the CPU 212 has determined in step S1206 that the mismatch determination process on all the sheet holding units has been completed (YES in step S1206), the processing returns to step S1204. Then, the CPU 212 performs the process of step S1204 and subsequent steps. If the CPU 212 has determined in step S1204 that the mismatch determination of all the sheet types to be used for the print job to be subjected to the mismatch determination has been completed (YES in step S1204), the mismatch determination process in the case of specifying a sheet type (step S1200) is completed. Then, the processing returns to step S1102 in FIG. 11. This is the detailed description of step S1200 in FIG. 11, which is the mismatch determination process to be performed when the print job is a sheet type specifying job.

Figure 13:
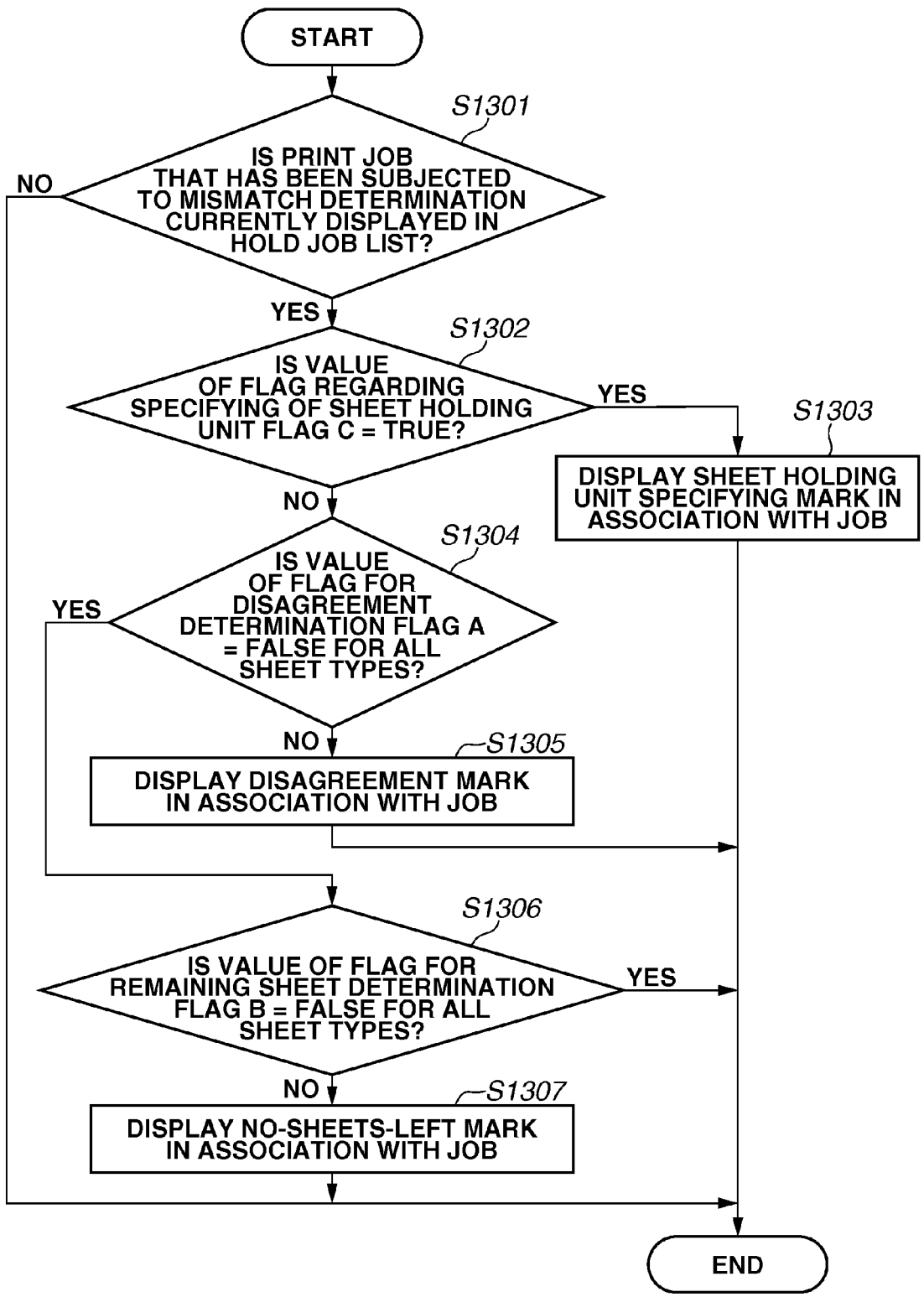
FIG. 13 is a flow chart illustrating a mismatch determination result notification process (step S1300) illustrated in FIG. 10 in the digital printing machine according to the first exemplary embodiment.

Next, with reference to FIG. 13, a description is given of step S1300 in FIG. 10, which is the process of notifying the hold job list 702 of the results of the mismatch determination. This process is achieved by the CPU 212 of the controller unit 205 executing the UI function program read from the ROM 207 or the HDD 209 and loaded into the RAM 208.

In step S1301, the CPU 212 determines whether the print job subjected to the mismatch determination is currently displayed in the hold job list 702. If the CPU 212 has determined that the print job subjected to the mismatch determination is currently displayed in the hold job list 702 (YES in step S1301), the processing proceeds to step S1302.

In step S1302, the CPU 212 determines whether the value of the flag regarding the specifying of a sheet holding unit (the flag C) is "true".

If the CPU 212 has determined that the value of the flag C is "true" (YES in step S1302), the processing proceeds to step S1303. In step S1303, as illustrated in FIG. 14, the CPU 212 displays a warning in the entry of the print job in the hold job list 702 by associating a sheet holding unit specifying mark 1403, which indicates that the print job is a sheet holding unit specifying job, with the print job. After the process of step S1303, a series of steps of the process of notifying the hold job list 702 of the results of the mismatch determination (step S1300) ends, and the processing returns to step S1001 in FIG. 10.

If, on the other hand, the CPU 212 has determined in step S1302 that the value of the flag C is not "true" (NO in step S1302), the processing proceeds to step S1304. In step S1304, the CPU 212 reads from the RAM 208 the value of the flag A, which is a flag for holding the result of the sheet type disagreement determination as to whether the attribute information of the sheets to be used for the print job subjected to the mismatch determination is registered in any of the sheet holding units. Then, the CPU 212 determines whether the value of the flag A is "false (matched)".

If the CPU 212 has determined that the value of the flag A is true (mismatched) for at least one of the sheet types, it indicates that the medium is in a mismatched (sheet type disagreement) state, i.e., the print job specifies a sheet type that is not set in any of the sheet holding units. Thus, in this case (NO in step S1304), the processing proceeds to step S1305. In step S1305, for example, as illustrated in FIG. 14, the CPU 212 displays a warning in the entry of the print job in the hold job list 702 by associating a disagreement mark 1401, which indicates that at least one medium is in a mismatched state, with the print job. The disagreement mark 1401 indicates that sheets of the sheet type (the size and the medium type) to be used for the print job are not set in any of the sheet holding units. After the process of step S1305, the series of steps of the process of notifying the hold job list 702 of the results of the mismatch determination (step S1300) ends, and the processing returns to step S1001 in FIG. 10.

If, on the other hand, the CPU 212 has determined in step S1304 that the value of the flag A is "false (matched)" for all the sheet types (YES in step S1304), the processing proceeds to step S1306. In step S1306, the CPU 212 reads the value of the flag B from the RAM 208 and determines whether the value of the flag B is "false (sheets are left)". The flag B is a flag for holding the result of the sheet remainder determination as to whether sheets to be used in the print job subjected to the mismatch determination are left.

If the CPU 212 has determined in step S1306 that the value of the flag B is true (no sheets are left) for at least one of the sheet types, it indicates that the medium is in a mismatched (no-sheets-left) state, i.e., the remaining amount of sheets of the sheet type to be used for the print job is 0. Thus, in this case (NO in step S1306), the processing proceeds to step S1307. In step S1307, for example, as illustrated in FIG. 14, the CPU 212 displays a warning in the entry of the print job in the hold job list 702 by associating a no-sheets-left mark 1402, which indicates that at least one medium is in a mismatched state, with the print job. The no-sheets-left mark 1402 indicates that sheets to be used for the print job are set in the sheet holding unit, but the remaining amount of sheets is 0. After the process of step S1307, the series of steps of the process of notifying the hold job list 702 of the results of the mismatch determination (step S1300) ends, and the processing returns to step S1001 in FIG. 10.

If, on the other hand, the CPU 212 has determined in step S1306 that the value of the flag B is false (no sheets are left) for all the sheet types (YES in step S1306), this means that sheets of all the sheet types to be used for the print job are left. Then, the series of steps of the process of notifying the hold job list 702 of the results of the mismatch determination (step S1300) ends, and the processing returns to step S1001 in FIG. 10.

Next, with reference to FIG. 14, a description is given of an example of the operation screen after the hold job list 702 has been notified of the results of the mismatch determination, in the digital printing machine 102 according to the first exemplary embodiment. On the other hand, FIG. 7B illustrates an example of display immediately after the operator A has selected print jobs by operating the operation screen of the job hold function displayed on the operation unit 204. In FIG. 14, the portions similar to those of FIG. 7B are represented by the same numerals. In FIG. 14, similarly to FIG. 7B, as a result of the operator A sequentially selecting the jobs A, D, and E, three jobs are in selected states.

In FIG. 14, regarding each of the three jobs (the jobs A, D, and E) selected by the user, the matching between sheets to be used for the print job and the sheets set in the sheet holding units of the digital printing machine 102 is checked (mismatch determination).

As a result of the mismatch determination, for example, the job A is a sheet holding unit specifying job as illustrated in FIG. 8. Therefore, the sheet holding unit specifying mark 1403 is displayed in association with the job A. Having confirmed that the job A is a sheet holding unit specifying job, the user presses the details/change button 710 to confirm the method of determining a sheet holding unit to feed sheets to be used for the job A with reference to the job setting table, before pressing the start printing button 711 to give an instruction to start printing the job A. Then, the user confirms whether desired sheets are currently held in the sheet holding units (e.g., the sheet holding units 1 and 8) specified as sheet holding units to feed sheets to be used for the job A. Having recognized that the desired sheets are not currently held, the user may take appropriate measures, that is, exchange the sheets held in the sheet holding units specified as sheet holding units to feed sheets to be used for the sheet holding unit specifying job to the desired sheets.

Further, in the case of the job D, sheets to be used for the print job are set and registered in the sheet holding units as illustrated in FIGS. 8 and 9. The remaining amount of sheets, however, is 0 in some of the sheet holding units. More specifically, the remaining amount of sheets which are set and registered in a "sheet holding unit 9" and of which the size is "11×17" and the medium type is "plain paper 1" is 0. Thus, if the user presses the start printing button 711 in this state, a mismatch occurs (no sheets are left) when the sheets of the size "11×17" is about to be fed. Consequently, the printing process stops. Thus, the no-sheets-left mark 1402 is displayed with the job D. Having recognized the display of the no-sheets-left mark 1402, the user may take appropriate measures, i.e., supply sheets of the size "11×17" and the medium type "plain paper 1" to the sheet holding unit 9.

Further, in the case of the job E, sheets to be used for the print job include sheets that are not set and registered in any of the sheet holding units as illustrated in FIGS. 8 and 9. More specifically, sheets of the size A3 and the medium type "two-sided coated paper 2" are not set and registered in any of the sheet holding units. Thus, the disagreement mark 1401 is displayed with the job E. If the user presses the details/change button 710 in the state of FIG. 14, the sheet sizes and the medium types 808, 809, and 810 to be used for the selected job E are displayed as illustrated in FIG. 8. At this time, information regarding a medium (A3 and two-sided coated paper in this case) that is not set and registered in any of the sheet holding units is, for example, highlighted. Thus, it is possible to present, to the user, sheets that are not set and registered in any of the sheet holding units. Therefore, in this state, before giving an instruction to start printing, the user can know that if the user presses the start printing button 711, a mismatch (sheet type disagreement) will occur and the print job will stop before the user attempts to feed the sheets. Having confirmed the display of the disagreement mark 1401, the user takes appropriate measures, i.e., specifies another one of the sheet holding units (desirably a sheet holding unit that has not been determined to be used for the print job) and changes the settings and the registration of sheets of the sheet holding unit to be the size A3 and the medium type "two-sided coated paper 2". Further, the user supplies corresponding sheets to the sheet holding unit. If sheets are originally held in the sheet holding unit, the user may replace the originally held sheets with the corresponding sheets.

In the present exemplary embodiment, as illustrated in FIG. 14, the shapes of the disagreement mark 1401, the no-sheets-left mark 1402, and the sheet holding unit specifying mark 1403 are different from each other. This enables the user to distinctively recognize whether sheets for the job are not set in any of the sheet holding units, or whether sheets for the job are set in any of the sheet holding units but the remaining amount of sheets is 0, or whether the job is a sheet holding unit specifying job. As described above, if the mismatch determination is performed in this way, a warning is displayed by associating the mark 1401, 1402, or 1403 with a print job in which a mismatch is likely to occur. This enables the user to prevent a print job from stopping, and avoid the situation where desired printed matter is not obtained for a sheet holding unit specifying job.

Further, if the user has selected the job D and pressed the details/change button 710 in the state of FIG. 14, the sheet sizes and the medium types 806 and 807 to be used for the job D are displayed. At this time, information regarding sheets of which remaining amount is 0 is caused to blink. Further, the display of the sheet holding unit in which the sheets are set and registered is caused to blink. This enables the user to understand information regarding sheets of which the sheet size and the medium type are to be used in the job D and the remainder is 0, and understand the sheet holding unit of the sheets. As described above, also when the sheet size and the medium type are displayed, the manner of displaying sheet information when the sheets are not set and registered in any of the sheet holding units and the manner of displaying sheet information when the remaining amount of sheets is 0 are changed. This enables the user to distinctively know whether sheets of the displayed size and type are not set and registered in any of the sheet holding units, or whether the remaining amount of sheets of the displayed size and type is 0. In this case, information regarding a medium that is not set and registered in any of the sheet holding units is highlighted, and information regarding sheets of which the remaining amount is 0 is caused to blink. The present invention, however, is not limited to this. Alternatively, a warning may be displayed by associating the disagreement mark 1401 or the no-sheets-left mark 1402 with each of the pieces of sheet information.

As described above, in the first exemplary embodiment, the processing operation of a mismatch determination is controlled according to whether the print job is a job specifying a particular sheet holding unit to feed sheets to be used for the print job. If a mismatch determination of a sheet type specifying job has been made, the user is notified of the results of the mismatch determination (the disagreement mark 1401 or the no-sheets-left mark 1402). If, on the other hand, a mismatch determination of a sheet holding unit specifying job has been made, the user is notified that the job is a sheet holding unit specifying job (the sheet holding unit specifying mark 1403). Thus, the user can confirm the results of the mismatch determination before the user gives an instruction to execute the job. Thus, before giving an instruction to perform a printing process, the user can take appropriate measures according to the content of the notification to prevent the print job from stopping. Further, the user can also avoid the situation where desired printed matter is not obtained.

In the first exemplary embodiment, a case has been described where according to the fact that a mismatch determination has been made, the sheet holding unit specifying mark 1403 is displayed in the hold job list 702 in association with a sheet holding unit specifying job. The present invention, however, is not limited to such a case. Regardless of whether a mismatch determination is made, the sheet holding unit specifying mark 1403 may be displayed in association with a sheet holding unit specifying job according to the fact that print jobs stacked in the hold queue buffer 531 have been displayed in the hold job list 702.

Further, in the first exemplary embodiment, a case has been described where the mark 1401, 1402, or 1403 is displayed on the operation unit 204 in association with a job subjected to a mismatch determination, thereby notifying the user of the results of the mismatch determination. The present invention, however, is not limited to such a case. The user only needs to be able to confirm that a job subjected to a mismatch determination is a job in which a mismatch has occurred, or is a sheet holding unit specifying job, before giving an instruction to execute the job. Thus, the user may be notified of the results of the mismatch determination using other identifiable marks or using sound or light.

In the above first exemplary embodiment, a case has been described where, if a mismatch determination of a sheet type specifying job has been made, the user is notified of the results of the mismatch determination (a disagreement determination and a sheet remainder determination). If, on the other hand, a mismatch determination of a sheet holding unit specifying job has been made, the user is notified that the job is a sheet holding unit specifying job.

Then, a case has been described where, after the user has been notified that the job is a sheet holding unit specifying job, the user confirms whether desired sheets are held in the sheet holding unit specified as a sheet holding unit to feed sheets to be used for the sheet holding unit specifying job, before giving an instruction to perform a printing process.

On the other hand, in a second exemplary embodiment, a case is described where, if a mismatch determination of a sheet holding unit specifying job has been made, the user is notified that the job is a sheet holding unit specifying job, and additionally, it is determined whether desired sheets are held in the specified sheet holding unit. Then, the user is notified of the result of the determination.

A printing system according to the second exemplary embodiment is configured in such a manner that, similar to the first exemplary embodiment, a digital printing machine 102 and a computer 101 are connected via a network 100. Further, a functional block diagram illustrating the functional configuration of the digital printing machine 102 according to the second exemplary embodiment and a hardware block diagram illustrating the configuration of the computer (PC) 101 according to the second exemplary embodiment are similar to those of the first exemplary embodiment, and therefore are not described here.

A series of flow charts illustrating processing of the digital printing machine 102 according to the second exemplary embodiment is similar to those in FIG. 6 and FIGS. 10 to 13 described in the first exemplary embodiment, and therefore is not described in detail. In the second exemplary embodiment, the processes different from the first exemplary embodiment are mainly described below.

Figure 15:
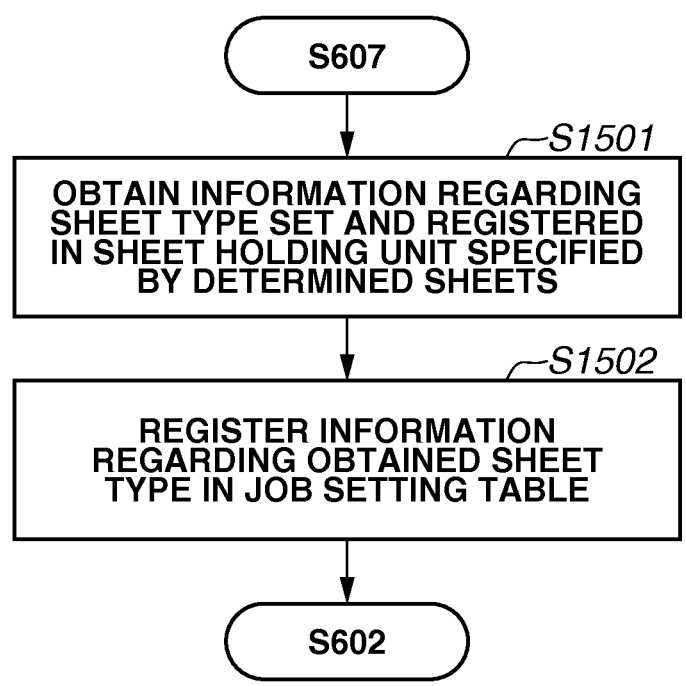
FIG. 15 is a flow chart illustrating a process of registering job settings of a job registered in a hold queue buffer in a digital printing machine according to a second exemplary embodiment.

FIG. 15 is a flow chart illustrating the processes, in the second exemplary embodiment, different from the first exemplary embodiment in the process of registering the job settings of a print job registered in a hold queue buffer. This process corresponds to that described with reference to FIG. 6 in the first exemplary embodiment. In the flow of FIG. 15, the differences from the flow of FIG. 6 are mainly described, and the processes similar to those in the flow of FIG. 6 are not described here.

In the second exemplary embodiment, after, in step S607, the CPU 212 registers the sheet holding unit number 813 specified by the sheets determined in step S603 in the job setting table, the processing does not return to step S602 but proceeds to step S1501 in FIG. 15.

In step S1501, the CPU 212 obtains information regarding the sheet type set and registered in the sheet holding unit specified by the sheets determined in step S603. More specifically, the CPU 212 gives an instruction to the medium management unit 211 and refers to the sheet management table illustrated in FIG. 9, thereby obtaining information regarding the sheet type set and registered in the specified sheet holding unit. For example, if the sheet holding unit specifying job specifies the sheet holding unit 1 as a sheet holding unit to feed the sheets to be used for the print job, the CPU 212 obtains "A4 plain paper 1" with reference to the sheet management table illustrated in FIG. 9.

Next, in step S1502, the CPU 212 registers the information regarding the sheet type obtained in step S1501 in a job setting table as illustrated in FIG. 16.

For example, a job A, which is a sheet holding unit specifying job, specifies the sheet holding units 1 and 8 as sheet holding units to feed sheets to be used for the print job. Thus, in step S1501, with reference to the sheet management table illustrated in FIG. 9, the CPU 212 obtains "plain paper 1", which is set and registered in the sheet holding unit 1, and "two-sided coated paper 1", which is set and registered in the sheet holding unit 8. Then, in step S1502, the CPU 212 registers "plain paper 1" and "two-sided coated paper 1" in information 1601 and information 1602 regarding the medium type 812 in the job setting table as illustrated in FIG. 16.

After the process of step S1502, the processing returns to step S602 in FIG. 6. Then, the CPU 212 performs the process of step S602 and thereafter.

This is the details of the processes different from the first exemplary embodiment in the process of registering the job settings of a print job registered in a hold queue buffer.

Figure 18:
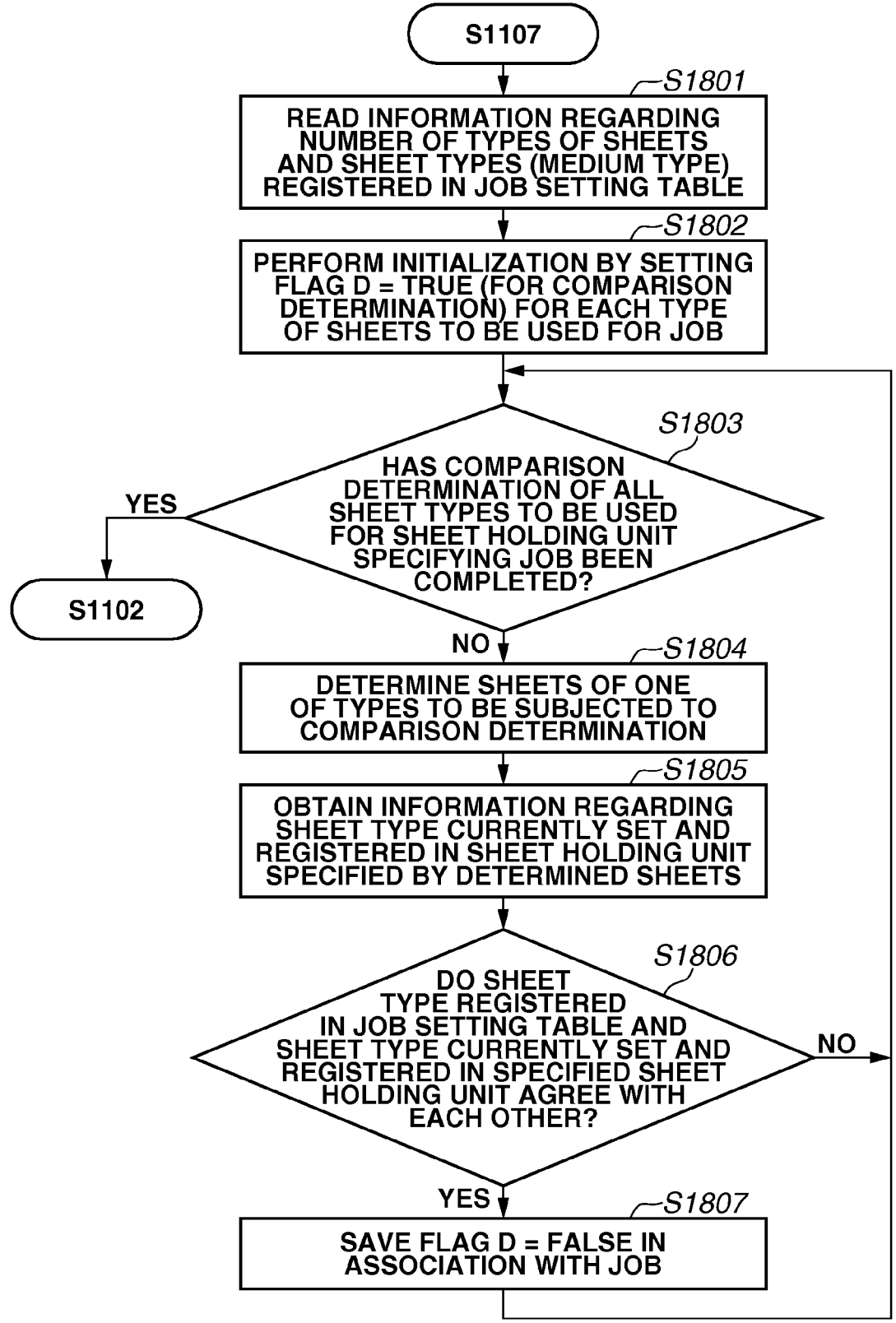
FIG. 18 is a flow chart illustrating a mismatch determination process (step S1100) illustrated in FIG. 10 in the digital printing machine according to the second exemplary embodiment.

Next, FIG. 18 is a flow chart illustrating the processes, in the second exemplary embodiment, different from those in the first exemplary embodiment in the mismatch determination process (step S1100) illustrated in FIG. 10. This process corresponds to that described with reference to FIG. 11 in the first exemplary embodiment. In the flow of FIG. 18, the differences from the flow of FIG. 11 are mainly described, and the processes similar to those in the flow of FIG. 11 are not described here.

In the second exemplary embodiment, after, in step S1107, the CPU 212 saves the value of the flag regarding the specifying of a sheet holding unit (the flag C) as "true", which indicates that the print job is a sheet holding unit specifying job, in association with the print job, the processing does not return to step S1102 but proceeds to step S1801 in FIG. 18.

In step S1801, the CPU 212 reads attribute information of sheets to be used for the sheet holding unit specifying job, such as the size 811, the medium type 812, and the sheet holding unit number 813, from the job setting table as illustrated in FIG. 16. Then, the CPU 212 obtains information regarding the number of the sheets to be used for the print job and the sheet types (the medium type 812).

Then, in step S1802, the CPU 212 performs an initialization process by setting a flag (a flag D) for holding the result of a comparison determination described below, for each type of sheets obtained in step S1801. The flag D is a flag for holding the result of comparing the sheet type set and registered in the sheet holding unit specified by the sheet holding unit specifying job when the job has been registered in the hold queue buffer 531 with that when the job has been subjected to the mismatch determination, and determining whether the sheet types agree with each other. The value of the flag D is stored in the RAM 208. If the value of the flag D is "true", this means a disagreement state. In other words, it indicates that the sheet type set and registered in the sheet holding unit specified by the sheet holding unit specifying job when the job has been registered in the hold queue buffer 531 is different from that when the job has been subjected to the mismatch determination. The value of the flag D is initialized to true (mismatched).

Next, in step S1803, the CPU 212 determines whether the comparison determination process on all the types of sheets to be subjected to the comparison determination obtained in step S1801 has been completed. If the CPU 212 has determined that the comparison determination process on all the types of sheets has not been completed (NO in step S1803), the processing proceeds to step S1804.

In step S1804, the CPU 212 determines sheets of one type to be subjected to the comparison determination among the types of sheets to be used for the sheet holding unit specifying job, and the processing proceeds to step S1805.

In step S1805, the CPU 212 obtains information regarding the sheet type currently set and registered in the sheet holding unit specified to feed the sheets determined in step S1804, and the processing proceeds to step S1806. More specifically, the CPU 212 gives an instruction to the medium management unit 211 and refers to the sheet management table illustrated in FIG. 9 (FIG. 17), thereby obtaining the information.

In step S1806, the CPU 212 compares the sheet type (the medium type 812) obtained in step S1801 with the sheet type obtained in step S1805, thereby determining whether the sheet types agree with each other.

For example, there is a case where the medium type 913 of the sheets currently set and registered in the sheet holding unit 1 has been changed from "plain paper 1" as illustrated in FIG. 9 to "embossed paper" as illustrated in FIG. 17. That is, the sheets held in the sheet holding unit 1 have been replaced between when the job has been registered in the hold queue buffer 531 and when the job has been subjected to the mismatch determination. In such a case, the CPU 212 compares "plain paper 1", which is the sheet type (the medium type 812) obtained in step S1801, with "embossed paper", which is the sheet type obtained in step S1805, thereby determining that the sheet types do not agree with each other.

If the CPU 212 has determined in step S1806 that the sheet types agree with each other (YES in step S1806), the processing proceeds to step S1807. In step S1807, the CPU 212 saves the value of the flag D as "false (matched)", which indicates that the sheet types agree with each other as a result of the comparison determination, in association with the print job, and the processing returns to step S1803. Then, the CPU 212 performs the process of step S1803 and the subsequent processes. If, on the other hand, the CPU 212 has determined in step S1806 that the sheet types do not agree with each other (NO in step S1806), the processing returns to step S1803. Then, the CPU 212 performs the process of step S1803 and thereafter.

If the CPU 212 has determined in step S1803 that the comparison determination process on all the types of sheets to be subjected to the comparison determination obtained in step S1801 has been completed (YES in step S1803), the processing returns to step S1102 in FIG. 11. Then, the CPU 212 performs the process of S1102 and the subsequent processes.

This is the details of the processes different from the first exemplary embodiment in the mismatch determination process (step S1100) illustrated in FIG. 10. A case has been described where in step S1806, it is determined whether the sheet type set and registered in the sheet holding unit when the job has been registered in the hold queue buffer 531 agrees with that when the job has been subjected to the mismatch determination (i.e., the sheet type has been changed). The present invention, however, is not limited to such a case. Alternatively, for example, a case is considered where with the sheet holding unit specified as the sheet feeding source of a job to be subjected to a mismatch determination, a transition has been made once to a screen (not illustrated) for changing attribute information of the sheets of the sheet holding unit before the mismatch determination is made. In such a case, regardless of requirements such as whether the attribute information of the sheets of the sheet holding unit has actually been changed, the processing may return from step S1806 to step S1803 on the assumption that the attribute information (the sheet type) of the sheets of the sheet holding unit has been updated (that is, the determination in step S1806 is NO).

Figure 19:
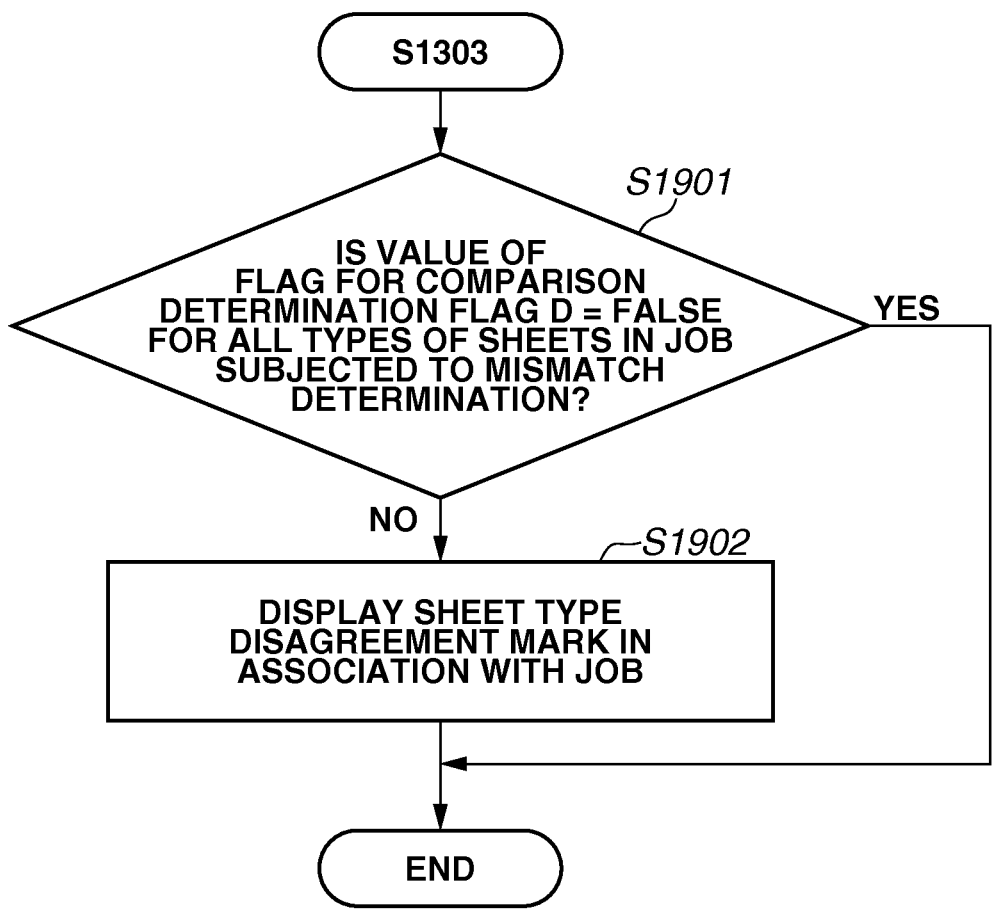
FIG. 19 is a flow chart illustrating a mismatch determination result notification process (step S1300) illustrated in FIG. 10 in the digital printing machine according to the second exemplary embodiment.

Next, FIG. 19 is a flow chart illustrating the processes, in the second exemplary embodiment, different from those of the first exemplary embodiment in the mismatch determination result notification process (step S1300) illustrated in FIG. 10. This process corresponds to that described with reference to FIG. 13 in the first exemplary embodiment. In the flow of FIG. 19, the differences from the flow of FIG. 13 are mainly described, and the processes similar to those in the flow of FIG. 13 are not described here.

In the second exemplary embodiment, after the CPU 212 displays a warning by associating the sheet holding unit specifying mark 1403, which indicates that the print job is a sheet holding unit specifying job, with the sheet holding unit specifying print job in step S1303, the processing proceeds to step S1901.

In step S1901, the CPU 212 reads from the RAM 208 the value of the above-described flag D, which is a flag for the comparison determination, for all the types of sheets to be used for the sheet holding unit specifying job subjected to the mismatch determination. Then, the CPU 212 determines whether the value of the flag D is "false (matched)".

Figure 20:
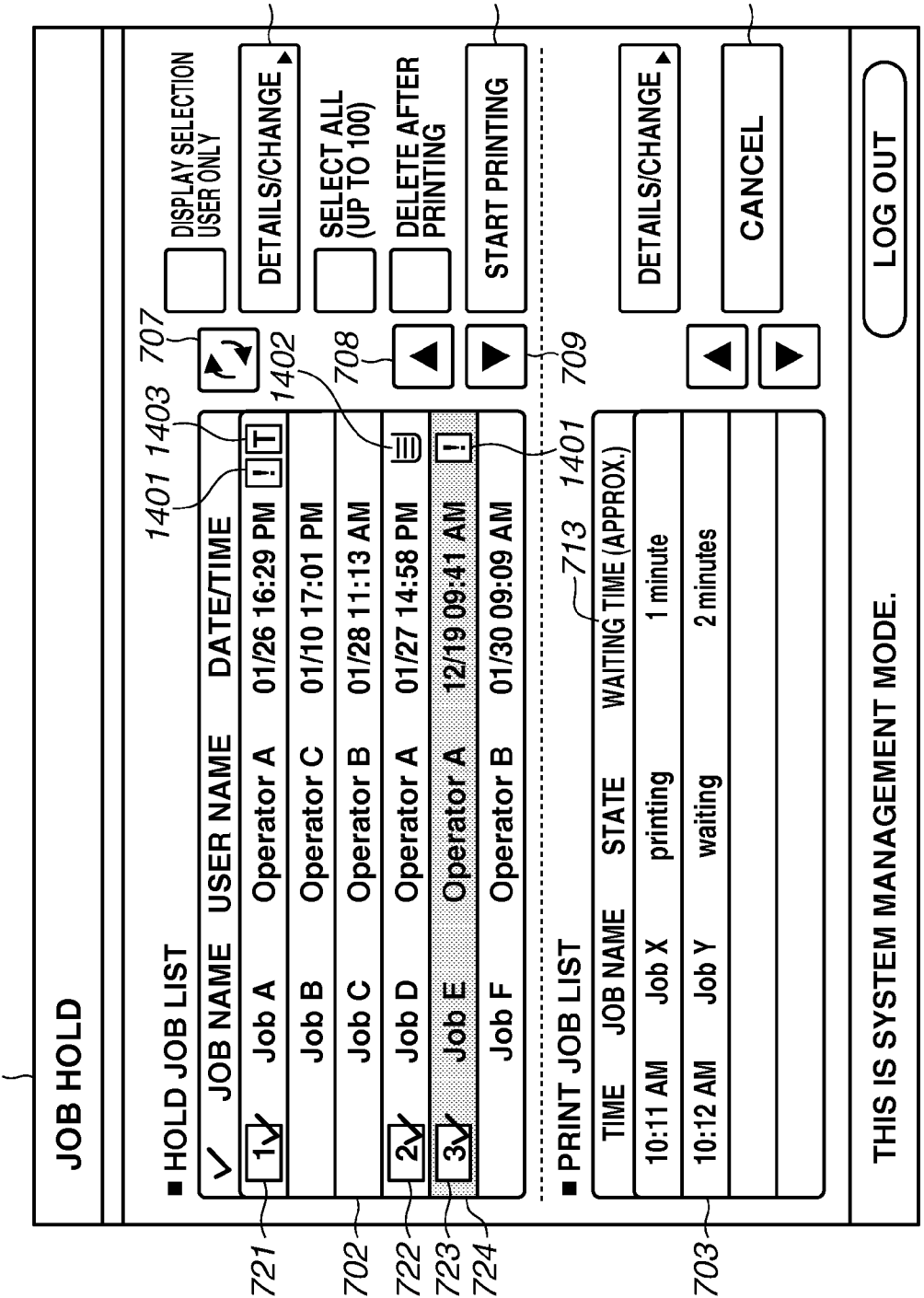
FIG. 20 is a diagram illustrating an example of an operation screen of a job hold function displayed on an operation unit of the digital printing machine according to the second exemplary embodiment.

If the CPU 212 has determined that the value of the flag D is true for at least one of the types of sheets (NO in step S1901), the medium is in a mismatched (sheet type disagreement) state. In other words, the sheet type set and registered in the sheet holding unit specified in the sheet holding unit specifying job when the job has been registered in the hold queue buffer 531 is different from that when the job has been subjected to the mismatch determination. Thus, in this case (NO in step S1901), the processing proceeds to step S1902. In step S1902, for example, as illustrated in FIG. 20, the CPU 212 displays a warning in the entry of the sheet holding unit specifying print job in the hold job list 702 by associating the disagreement mark 1401 with the print job in addition to the sheet holding unit specifying mark 1403. After the process of step S1902, the mismatch determination result notification process (step S1300) ends, and the processing returns to step S1001 in FIG. 10.

If, on the other hand, the CPU 212 has determined in step S1901 that the value of the flag D is false for all the types of sheets (YES in step S1901), the mismatch determination result notification process (step S1300) ends, and the processing returns to step S1001 in FIG. 10.

This is the details of the processes different from those of the first exemplary embodiment in the mismatch determination result notification process (step S1300) illustrated in FIG. 10.

As described above, in the second exemplary embodiment, if a mismatch determination of a sheet type specifying job has been made, the user is notified of the results of the mismatch determination. If, on the other hand, a mismatch determination of a sheet holding unit specifying job has been made, the user is notified that the job is a sheet holding unit specifying job, and additionally, it is determined whether desired sheets are held in the specified sheet holding unit. Then, the user is notified of the result of the determination. As described above, the user can confirm the results of the mismatch determination. Therefore, before giving an instruction to execute the job, the user can take appropriate measures according to the content of the notification to prevent the print job from stopping. Further, the user can also avoid the situation where desired printed matter is not obtained.

In the second exemplary embodiment, a case has been described where a warning is displayed by associating the fact that the sheet type set and registered in the sheet holding unit specified by a received job when the job has been registered in the hold queue buffer 531 is different from that when the job has been subjected to a mismatch determination, with the entry of the job. That is, a case has been described where in steps S1501 and S1502, the CPU 212 obtains information regarding the sheet type set and registered in the sheet holding unit specified by sheets to be used for a sheet holding unit specifying job and registers the information in a job setting table. Further, a case has been described where in step S1806, the CPU 212 compares information regarding the sheet type registered in the job setting table with information regarding the sheet type currently set and registered in the sheet holding unit specified by sheets to be used for the job, thereby determining whether the sheet types agree with each other. Then, a case has been described where according to the determination that the sheet types do not agree with each other, the CPU 212 displays a warning by associating the disagreement mark 1401 with the entry of the job. The present invention, however, is not limited to this.

For example, after having registered a received job in the hold queue buffer 531, the CPU 212 may display a warning in association with the entry of the job according to a change in the sheet type set and registered in the sheet holding unit specified by the job. Alternatively, after having registered a received job in the hold queue buffer 531, the CPU 212 may display a warning in association with the entry of the job according to the fact that a screen (not illustrated) for changing the sheet type set and registered in the sheet holding unit specified by the job has been called. Alternatively, if a sensor for detecting the operation of opening and closing each sheet holding unit is provided, after having registered a received job in the hold queue buffer 531, the CPU 212 may display a warning in association with the entry of the job according to the detection of the operation of opening and closing the sheet holding unit specified by the job.

That is, after having registered a received job in the hold queue buffer 531, the CPU 212 may display a warning in association with the entry of the job according to the occurrence of a factor in changing the sheet type set and registered in the sheet holding unit specified by the job. In this case, it is not necessarily essential to obtain information regarding the sheet type set and registered in the sheet holding unit specified by sheets to be used for the sheet holding unit specifying job and register the information in the job setting table.

In the second exemplary embodiment, a case has been described where a warning is displayed by associating the disagreement mark 1401 with a sheet holding unit specifying job in addition to the sheet holding unit specifying mark 1403. The present invention, however, is not limited to such a case. A warning may be displayed using a single fused mark representing both the state where "the job is a sheet holding unit specifying job" and the state where "the sheet type set and registered in the sheet holding unit specified by a received job when the job has been registered in the hold queue buffer 531 is different from that when the job has been subjected to a mismatch determination".

The present invention is not limited to the above exemplary embodiments. Various modifications (including the organic combination of the exemplary embodiments) can be made based on the spirit of the present invention, but are not excluded from the scope of the present invention.

For example, in the present exemplary embodiment, the CPU of the controller unit 205 of the digital printing machine 102 performs various types of control. Alternatively, a print control apparatus such as an external controller having a housing separate from the digital printing machine 102 may be configured to perform some or all of the various types of control.

While various examples and exemplary embodiments of the present invention have been described, the spirit and scope of the present invention are not limited to a particular description in the specification for a person skilled in the art.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207423 filed Oct. 2, 2013, which is hereby incorporated by reference herein in its entirety.

What is claimed is:

1. A control apparatus comprising:
   at least one processor coupled to a memory;
   a receiving unit configured to receive a job;
   a display configured to display the job received by the receiving unit;
   a first storing unit configured to store attribute information of a sheet as attribute information of a sheet held in a sheet holding unit;
   an obtaining unit configured to obtain, from the first storing unit and in response to receipt of the job by the receiving unit, attribute information of a sheet held in a sheet holding unit specified in the job;
   a second storing unit configured to store the attribute information of the sheet obtained by the obtaining unit;
   a changing unit configured to change attribute information of a sheet stored in the first storing unit;
   a determining unit configured to determine whether the attribute information of the sheet stored in the first storing unit corresponds to the attribute information of the sheet stored in the second storing unit; and
   a notification unit configured to perform, based on the determination by the determining unit that the attribute information of the sheet stored in the first storing unit does not correspond to the attribute information of the sheet stored in the second storing unit, notification that the attribute information of the sheet stored in the first storing unit has been changed by the changing unit,
   wherein the receiving unit, the obtaining unit, the changing unit, the determining unit, and the notification unit are implemented by the at least one processor.

2. The control apparatus according to claim 1, further comprising a reception unit implemented by the at least one processor and configured to receive an instruction to execute the job displayed on the display, wherein the notification unit performs the notification before the reception unit receives the instruction to execute the job.

3. The control apparatus according to claim 1, further comprising an instruction unit implemented by the at least one processor and configured to issue an instruction to the determining unit to determine whether the attribute information of the sheet stored in the first storing unit has been changed,
   wherein the determining unit determines whether the attribute information of the sheet stored in the first storing unit corresponds to the attribute information of the sheet stored in the second storing unit according to the instruction received from the instruction unit.

4. The control apparatus according to claim 1, wherein the notification unit further performs notification of, from among a plurality of jobs which is to be displayed on the display, a first job in which a sheet holding unit to feed a sheet to be used for the job is specified and a second job in which attribute information of a sheet to be used for the job is specified, in an identifiable manner.

5. The control apparatus according to claim 1, wherein the notification unit performs the notification using a mark, sound, or light.

6. The control apparatus according to claim 1, wherein the notification is performed in an identifiable manner in association with the job displayed on the display.

7. A control apparatus comprising:
   at least one processor coupled to a memory;
   a first receiving unit configured to receive a job;
   a holding unit configured to hold the job received by the first receiving unit;
   a display configured to display the job held in the holding unit;
   a second receiving unit configured to receive an instruction to execute the job displayed on the display; and
   a notification unit configured to perform, before the second receiving unit receives the instruction to execute the job, notification of, from among a plurality of jobs which is to be displayed on the display, a first job in which a sheet holding unit to feed a sheet to be used for the job is specified and a second job in which a sheet holding unit to feed a sheet to be used for the job is not specified in an identifiable manner,
   wherein the first receiving unit, the second receiving unit, and the notification unit are implemented by the at least one processor.

8. The control apparatus according to claim 7, wherein the second job is a job in which attribute information of a sheet to be used for the job is specified.

9. The control apparatus according to claim 7, wherein the notification is performed in an identifiable manner in association with each of the plurality of jobs that is to be displayed on the display.

10. The control apparatus according to claim 7, wherein the notification unit performs the notification unit performs the notification using a mark, sound, or light.

11. A control method for a control apparatus having a first storing unit configured to store attribute information of a sheet as attribute information of a sheet held in a sheet holding unit, the control method comprising:
    receiving a job;
    displaying the received job on a display;
    obtaining, via at least one processor and from the first storing unit and in response to receipt of the job, attribute information of a sheet held in a sheet holding unit specified in the job;
    storing, in a second storing unit, the obtained attribute information of the sheet;
    changing attribute information of a sheet stored in the first storing unit;
    determining whether the attribute information of the sheet stored in the first storing unit corresponds to the attribute information of the sheet stored in the second storing unit; and
    performing, based on the determination that the attribute information of the sheet stored in the first storing unit does not correspond to the attribute information of the sheet stored in the second storing unit, notification that the attribute information of the sheet stored in the first storing unit has been changed.

12. A non-transitory computer readable storage medium storing a computer program to cause a control apparatus to perform a control method, wherein the control apparatus includes a first storing unit configured to store attribute information of a sheet as attribute information of a sheet held in a sheet holding unit, the control method comprising:
    receiving a job;
    displaying the received job on a display;
    obtaining, via at least one processor and from the first storing unit and in response to receipt of the job, attribute information of a sheet held in a sheet holding unit specified in the job;
    storing, in a second storing unit, the obtained attribute information of the sheet;

changing attribute information of a sheet stored in the first storing unit;

determining whether the attribute information of the sheet stored in the first storing unit corresponds to the attribute information of the sheet stored in the second storing unit; and performing, based on the determination that the attribute information of the sheet stored in the first storing unit does not correspond to the attribute information of the sheet stored in the second storing unit, notification that the attribute information of the sheet stored in the first storing unit has been changed.

* * * * *